US009350051B2

(12) United States Patent
Teramoto et al.

(10) Patent No.: US 9,350,051 B2
(45) Date of Patent: May 24, 2016

(54) SECONDARY BATTERY CELL, BATTERY PACK, AND ELECTRIC POWER CONSUMPTION DEVICE

(75) Inventors: Shigeki Teramoto, Kanagawa (JP); Shinichi Uesaka, Kanagawa (JP); Atsushi Ozawa, Kanagawa (JP); Kazuo Nakamura, Kanagawa (JP); Asami Yoshida, Kanagawa (JP); Toru Akishita, Tokyo (JP); Shiho Moriai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 41 days.

(21) Appl. No.: 13/988,162

(22) PCT Filed: Nov. 17, 2011

(86) PCT No.: PCT/JP2011/077105
§ 371 (c)(1),
(2), (4) Date: May 17, 2013

(87) PCT Pub. No.: WO2012/070632
PCT Pub. Date: May 31, 2012

(65) Prior Publication Data
US 2013/0244062 A1 Sep. 19, 2013

(30) Foreign Application Priority Data

Nov. 26, 2010 (JP) .............................. P2010-263350
Mar. 11, 2011 (JP) .............................. P2011-054408

(51) Int. Cl.
*H01M 14/00* (2006.01)
*H01M 10/42* (2006.01)
*H01M 10/04* (2006.01)
*H01M 10/48* (2006.01)

(52) U.S. Cl.
CPC ........ *H01M 10/4257* (2013.01); *H01M 10/425* (2013.01); *H01M 10/4207* (2013.01); *H01M 10/0431* (2013.01); *H01M 10/48* (2013.01); *H01M 2010/4278* (2013.01)

(58) Field of Classification Search
CPC .... H01M 10/42; H01M 10/48; H01M 10/482
USPC .......................................................... 429/446
See application file for complete search history.

(56) References Cited

U.S. PATENT DOCUMENTS

2006/0114750 A1* 6/2006 Iida et al. ..................... 368/67
2008/0048876 A1* 2/2008 Miyajima et al. .......... 340/636.1

FOREIGN PATENT DOCUMENTS

| JP | 2002-118957 | 4/2002 |
| JP | 2003-077525 | 3/2003 |

(Continued)

OTHER PUBLICATIONS

Official Action issued by State Intellectual Property Office of the People's Republic of China (SIPO) on Nov. 21, 2014 in the counterpart foreign Application No. 201180055633.7, and English translation.

*Primary Examiner* — Jane Rhee
(74) *Attorney, Agent, or Firm* — Hazuki International, LLC

(57) ABSTRACT

Provided is a secondary battery cell that can certainly prevent detachment of an integrated circuit from the secondary battery cell and attachment of the integrated circuit to another secondary battery cell, a battery pack including such secondary battery cells, and an electric power consumption device including such a battery pack.
A secondary battery cell 20 of the present invention includes an integrated circuit (an IC chip) 50 that has stored identification information, and the integrated circuit 50 is driven by power from the secondary battery cell. A battery pack of the present invention includes secondary battery cells each including an integrated circuit (an IC chip) that has stored identification information, and the integrated circuits are driven by power from the secondary battery cells. An electric power consumption device of the present invention contains a battery pack that includes secondary battery cells each including an integrated circuit (an IC chip) that has stored identification information, and the integrated circuits are driven by power from the secondary battery cells.

19 Claims, 16 Drawing Sheets

(56) References Cited

FOREIGN PATENT DOCUMENTS

| JP | 2006-236806 | 9/2006 |
| JP | 2007-104745 | 4/2007 |
| JP | 2008-544730 | 12/2008 |
| JP | 2010-127805 | 6/2010 |
| JP | 2010-203848 | 9/2010 |
| JP | 2010-230355 | 10/2010 |

* cited by examiner (A)

(B)

SECONDARY BATTERY CELL, BATTERY PACK, AND ELECTRIC POWER CONSUMPTION DEVICE

TECHNICAL FIELD

The present invention relates to a secondary battery cell, a battery pack, and an electric power consumption device.

BACKGROUND ART

Battery packs have already been used in a wide variety of portable devices, such as portable telephones, digital still cameras, portable game machines, notebook personal computers, and electric tools. Today, battery packs are being used not only in the above mentioned devices but also in the fields that require higher power outputs and higher capacities, such as power-assisted bicycles and electric vehicles, and household electric storage devices.

One of the types of secondary battery cells that are currently the most often used in battery packs is lithium-ion secondary battery cell. A lithium-ion secondary battery cell has many advantageous features, such as being able to tolerate repetitive use, having high-voltage power outputs, having a high energy density, having a low self-discharge rate, and having a long life. Because of such advantageous features, lithium-ion secondary battery cells are being in a very wide variety of fields. Meanwhile, to satisfy the demand for higher-output and higher-capacity devices, secondary battery cells (single cells) are now often used in the form of an assembled battery, as a large number of cells are connected in series or in parallel. Such a method of use, though having great advantages, involves a very large amount of energy, and therefore, requires handling with greater care.

To determine whether battery packs mounted on electric power consumption devices can be used safely for the electric power consumption devices, many battery authentication systems have been introduced to authenticate the secondary battery cells provided in the battery packs. A technique of reading individual authentication information such as ID numbers from secondary battery cells each having a wireless IC tag (an integrated circuit) has been known from Japanese Patent Application Laid-Open No. 2006-236806, for example.

CITATION LIST

Patent Document

Patent Document 1: Japanese Patent Application Laid-Open No. 2006-236806

SUMMARY OF THE INVENTION

Problems to be Solved by the Invention

A wireless IC tag (an integrated circuit) disclosed in Japanese Patent Application Laid-Open No. 2006-236806 is not connected to a secondary battery cell, but is driven by power that is electromagnetic waves or microwaves that have been externally generated. Therefore, in practice, it is difficult to prevent detachment of a wireless IC tag from a secondary battery cell and attachment of the wireless IC tag to another secondary battery cell without any damage.

In view of the above, the object of the present invention is to provide a secondary battery cell that can certainly prevent detachment of an integrated circuit from the secondary battery cell and attachment of the integrated circuit to another secondary battery cell, a battery pack including such secondary battery cells, and an electric power consumption device including such a battery pack.

Solutions to Problems

A secondary battery cell of the present invention to achieve the above object includes an integrated circuit (an IC chip) that has stored identification information, and the integrated circuit is driven by power from the secondary battery cell.

A battery pack of the present invention to achieve the above object includes secondary battery cells each including an integrated circuit (an IC chip) that has stored identification information, and the integrated circuits are driven by power from the secondary battery cells.

An electric power consumption device of the present invention to achieve the above object includes a battery pack that includes secondary battery cells each including an integrated circuit (an IC chip) that has stored identification information, and the integrated circuits are driven by power from the secondary battery cells.

Effects of the Invention

In a secondary battery cell of the present invention, the secondary battery cells constituting a battery pack of the present invention, and the secondary battery cells in a battery pack of an electric power consumption device of the present invention (hereinafter those secondary battery cells will be also referred to as the "secondary battery cells and the like of the present invention"), each integrated circuit is driven by power from each corresponding secondary battery cell. Accordingly, when the integrated circuit provided in a secondary battery circuit is detached from the secondary battery cell, the power supply to the integrated circuit is stopped, and the detachment of the integrated circuit from the secondary battery cell can be certainly sensed. Moreover, each integrated circuit stores identification information (such as the identification number (ID number) allotted to the integrated circuit). Accordingly, each secondary battery cell in a battery pack mounted on an electric power consumption device can be easily and accurately authenticated.

MODE FOR CARRYING OUT THE INVENTION

Figure 1:
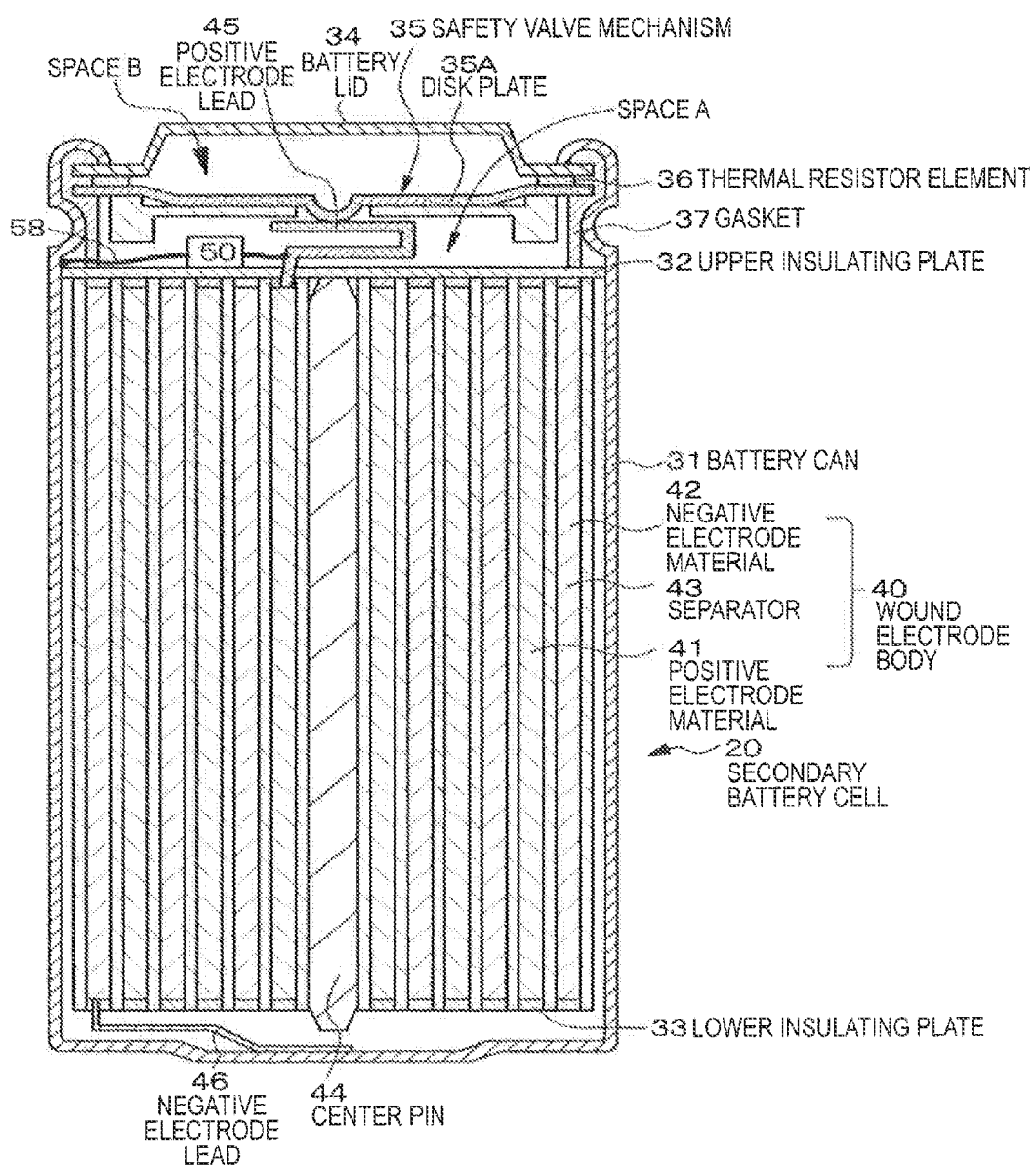
FIG. 1 is a schematic end view of a secondary battery cell of Example 1.

The following is a description of embodiments of the present invention, with reference to the accompanying drawings. However, the present invention is not limited to those embodiments, and various numerical values and materials in the embodiments are merely examples. Explanation will be made in the following order.
1. General description of a secondary battery cell, a battery pack, and an electric power consumption device of the present invention
2. Example 1 (secondary battery cells, a battery pack, and an electric power consumption device of the present invention)
3. Example 2 (a modification of Example 1)
4. Example 3 (another modification of Example 1)
5. Example 4 (another modification of Example 1)
6. Example 5 (another modification of Example 1)
7. Example 6 (another modification of Example 1)
8. Example 7 (another modification of Example 1)
9. Example 8 (another modification of Example 1)
10. Example 9 (another modification of Example 1) and others

[General Description of a Secondary Battery Cell, a Battery Pack, and an Electric Power Consumption Device of the Present Invention]

In a secondary battery cell and the like of the present invention, an integrated circuit preferably includes a storage area that stores the presence or absence of a power supply from the secondary battery cell. The storage area may be formed with a RAM or a register, for example, or may be formed with an EEPROM, for example. Also, the storage area is formed with bits, and preferably includes a flag area storing the presence or absence of a power supply from the secondary battery cell, and an error detection bit area for this flag area. When the power supply from a secondary battery cell to the corresponding integrated circuit is stopped, the data stored in the storage area (to be specific, the flag area and the error detection bit area) is lost, and a random value is stored when the power supply from the secondary battery cell to the integrated circuit is resumed. Accordingly, by checking the information (data) stored in the storage area, a control circuit described later can accurately determine that the integrated circuit is detached from the secondary battery cell.

In the secondary battery cell and the like of the present invention having the above described preferred embodiment, the integrated circuit may further store individual information. Here, the individual information may be at least one type of information selected from the group consisting of the identification number (the ID number) allotted to the secondary battery cell, the authentication number allotted to the secondary battery cell, the name of the manufacturer of the secondary battery cell, the name of the distributor of the secondary battery cell, the model number of the secondary battery cell, the rating of the secondary battery cell, the specification of the secondary battery cell, and the key information for authentication of the secondary battery cell, for example. If the individual information is the identification number and authentication number allotted, to the secondary battery cell, it is possible to easily and accurately determine whether the secondary battery cell is an authenticated, legitimate secondary battery cell.

In the secondary battery cell of the present invention including the respective preferred embodiments described above, [A] the integrated circuit can be configured to wirelessly send the identification information, or the identification information and the individual information (hereinafter also collectively referred to as the "identification information and the like"), to the outside of the secondary battery cell. Accordingly, the configuration of the battery pack can be simplified. Alternatively, [B] the integrated circuit can be configured to send the identification information and the like to the outside of the secondary battery cell in a wired manner. In the case of [B], when the integrated circuit is placed inside the secondary battery cell, the integrated circuit is preferably connected to an information output terminal and an information input terminal provided on the secondary battery cell, or to information input/output terminals. Accordingly, the sensing wires can be simplified in the entire battery pack, and the number of connecting points with the control circuit can be reduced. Thus, the reliability of the battery pack can be increased. Alternatively, in the case of [B], the integrated circuit may be connected to a power line that extends through the secondary battery cell and is used for supplying power to the outside, and may be configured to send the identification information and the like to the outside of the secondary battery cell via the power line. Accordingly, the identification information and the like can be superimposed on the power line path, and be sent to the control circuit. Thus, the configuration can be simplified. Further, in this case, a bandpass filter is preferably provided between the integrated circuit and the power line. The bandpass filter should be a bandpass filter that can pass frequencies that are communication frequencies suitable for transmitting the identification information and the like. The bandpass filter may be incorporated into the integrated circuit, or may be provided separately from the integrated circuit. Further, in the secondary battery cell of the present invention including each of the preferred embodiments described above, the integrated circuit is connected between the positive electrode and the negative electrode of the secondary battery cell.

In the secondary battery cell and the like of the present invention including each of the preferred embodiments described above, the integrated circuit may be provided inside the secondary battery cell, or may be provided outside (on an outer surface of) the secondary battery cell.

A battery pack or a battery pack in an electric power consumption device of the present invention including the above described preferred embodiments further includes a control circuit. Based on the identification information from the integrated circuit provided in each secondary battery cell, the control circuit may be configured to determine whether the integrated circuit is detached from the secondary battery cell (or authenticate the integrated circuit), and authenticate each secondary battery cell. In this case, the control circuit preferably stores the identification information about each secondary battery cell. Further, in those preferred structures, [a] the control circuit may be configured to wirelessly receive the identification information and the like, as well as the later described battery state in some cases, from the integrated circuit provided in each secondary battery cell. Accordingly, the configuration of the battery pack can be simplified. Alternatively, in those preferred structures, [b] the control circuit may be configured to receive the identification information and the like, as well as the later described battery state in some cases, from the integrated circuit provided in each secondary battery cell, based on capacitive coupling (AC coupling). Accordingly, the control circuit is not required to have a high withstanding voltage. In the case of [b], the integrated circuit sends the identification information and the like to the control circuit in a wired manner. When the integrated circuit is placed inside the secondary battery cell, however, the integrated circuit is preferably connected to an information output terminal and an information input terminal provided on the secondary battery cell, or to information input/output terminals. Accordingly, the sensing wires can be simplified in the entire battery pack, and the number of connecting points with the control circuit can be reduced. Thus, the reliability of the battery pack can be increased. Alternatively, in the embodiment [b], the integrated circuit may be connected to the control circuit via a power line that extends through the secondary battery cell and is used for supplying power to the outside, and the control circuit may be configured to receive the identification information and the like from the integrated circuit provided in each secondary battery cell via the power line. Accordingly, the identification information and the like can be superimposed on the power line path, and be sent to the control circuit. Thus, the configuration can be simplified. In this case, a bandpass filter is preferably provided between the integrated circuit and the power line. Further, in the secondary battery cell in the battery pack or the electric power consumption device of the present invention including the above described preferred embodiments and configurations, the integrated circuit is connected between the positive electrode and the negative electrode of the secondary battery cell.

The identification information and the like and various kinds of information stored in the integrated circuit, and/or the communication path may be encrypted, and accordingly, it is difficult for a third party to understand the information.

The integrated circuit may have a measurement function to measure the battery state (battery information). Accordingly, the secondary battery cell can collect the information about the battery state thereof, and the entire configuration of the battery pack can be simplified. Here, the battery state to be measured by the integrated circuit is at least one type of physical quantity selected from the group consisting of battery temperature, battery current, and battery terminal voltage. Although depending on which portion of the secondary battery cell the integrated circuit is located at, battery temperature means the temperature of the inside of the secondary battery cell or the temperature of the outer surface of the secondary battery cell. Battery current means the value of the current flowing between the positive electrode and the negative electrode of the secondary battery cell. Further, battery terminal voltage means the value of the voltage between the positive electrode and the negative electrode of the secondary battery cell. The battery state is sent, together with the identification information and the like, to the outside or the control circuit. To measure battery temperature, the integrated circuit may include a pn junction area, for example. The built-in potential (built-in voltage) in the pn junction area has temperature dependence. Accordingly, the temperature of the secondary battery cell can be determined by measuring the voltage value through application of a forward current to the pn junction area, or by measuring the current value through application of a constant forward voltage to the pn junction area. To measure battery current, a known current measuring circuit is provided in the integrated circuit. To measure battery terminal voltage, a known voltage measuring circuit is provided in the integrated circuit.

In the battery pack of the present invention including the above described preferred embodiments and configurations, or in the battery pack in the electric power consumption device of the present invention, the connection state of the secondary battery cells (the state of an assembled battery) is not limited, but the secondary battery cells may be connected in parallel, and the parallel-connected units may be connected in series. Alternatively, the secondary battery cells may be connected in series, and the series-connected units may be connected in parallel.

The control circuit may be formed with a circuit that includes a MPU and a storage means (such as an EEPROM), and, where necessary, further includes a communication circuit for receiving the identification information and the like, and information about the battery state from the integrated circuits, or for exchanging information with the integrated circuits. The same identification information and the like and the same information (data) as the identification information and the like and the information (data) stored in the memory units provided in the secondary battery cells are preferably stored in the control circuit. In some cases, a sequencer may be used in place of the MPU. As the control circuit sends control signals to the secondary battery cells, the integrated, circuits can be controlled. The control circuit is equivalent to "the outside". When wireless communication is performed, the wireless method may be an infrared method involving ZigBee or IrDA, a wireless LAN protocol such as Bluetooth or HomeRF, Wi-Fi, NFC, RFID, Felica, ISO/IEC 18092, ISO/IEC 14443, or the like.

As described above, an integrated circuit may be placed inside a secondary battery cell, or may be placed on an outer surface of the secondary battery cell. That is, as the various preferred embodiments and configurations of secondary battery cells and the like of the present invention, there are the following four embodiments in total:

[1] the integrated circuit is provided inside the secondary battery cell, the power source is the secondary battery cell, and a wireless method is used for transmitting the identification information and the like,

[2] the integrated circuit is provided inside the secondary battery cell, the power source is the secondary battery cell, and a wired method is used for transmitting the identification information and the like,

[3] the integrated circuit is provided on an outer surface of the secondary battery cell, the power source is the secondary battery cell, and a wireless method is used for transmitting the identification information and the like, and

[4] the integrated circuit is provided on an outer surface of the secondary battery cell, the power source is the secondary battery cell, and a wired method is used for transmitting the identification information and the like. It should be noted that the wired methods include an embodiment where each integrated circuit is connected to the above described power line.

When an integrated circuit is placed inside a cylindrical secondary battery cell, the integrated circuit is placed in an appropriate space such as an opening existing between an upper insulating plate and a safety valve mechanism provided in the secondary battery cell, or an opening existing immediately below a battery lid or a cap. When an integrated circuit is placed inside a secondary battery cell of a prismatic type such as a laminate type, the integrated circuit is placed in an appropriate space such as an opening surrounded by an insulating spacer located immediately below a sealing plate (a cap plate), or at a laminate portion, for example. To drive an integrated, circuit with the power from a secondary battery cell, the integrated circuit may be connected to the positive electrode or an extended positive electrode portion (such as a positive electrode lead, a positive electrode pin, or the battery lid) and the negative electrode or an extended negative electrode portion (such as a negative electrode lead or the battery can), or may be connected to a thermal resistor element (a positive temperature coefficient (PCT) element) and the negative electrode or an extended negative electrode portion. The same connection configuration as above can be used when the integrated circuit measures battery current and/or battery terminal voltage.

When an integrated circuit is placed on an outer surface of a secondary battery cell, on the other hand, the integrated circuit may be bonded to an outer surface of the secondary battery cell, or the integrated circuit may be laminated with an appropriate means on the outer surface of the secondary battery cell. Also, the integrated circuit can be connected by using part of an exterior film as an antenna, a wire, or the like. To drive the integrated circuit with the power from the secondary battery cell, the integrated circuit is connected to the positive electrode or an extended positive electrode portion and the negative electrode or an extended negative electrode portion by using an appropriate means. The same connection configuration as above can be used when the integrated circuit measures battery current and/or battery terminal voltage.

When a wireless method is used for transmitting the identification information and the like, the integrated circuit can be configured to include an antenna, and, in some cases, an electrode or the battery lid of the secondary battery cell can be used as an antenna. Alternatively, the exterior material of the secondary battery cell may be patterned to form an antenna. The antenna may be a coil antenna or a dipole antenna. When a wired method is used for transmitting the identification information and the like, the control circuit and each secondary battery cell are connected by a sensing wire or a power line.

The secondary battery cells may be lithium-ion secondary batteries. However, the secondary battery cells are not limited to them, and any kinds of secondary batteries can be used, depending on required characteristics. The configuration and structure of each secondary battery cell may be a known configuration and a known structure, and the shape of each secondary battery cell may be a known cylindrical shape or a prismatic shape such as a laminate type, as described above. A charge/discharge control circuit for controlling charging and discharging of the secondary battery cells can be formed with a known circuit that includes a MPU and a storage means (such as an EEPROM). The charge/discharge control circuit may include a known battery protection circuit, and the battery protection circuit is actuated to stop the battery pack from functioning, where necessary. It should be noted that the charge/discharge control circuit may be incorporated into the above described control circuit.

Battery packs according to the present invention can be applied to various kinds of electric power consumption devices, such as electric vehicles (including hybrid cars), golf carts, electric carts, electric motorcycles, power-assisted bicycles, railroad cars, electric tools such as electric drills, power supply units or home energy servers (household electric storage devices), personal computers, portable telephones, PDAs (Personal Digital Assistants), digital still cameras and video cameras, camcorders, electronic books, electronic dictionaries, music players, radio receivers, headphones, cordless handsets, electric shavers, refrigerators, air conditioners, television receivers and image display devices, monitors, stereo units, water heaters, microwave ovens, dishwashers, washing machines, drying machines, lighting equipment such as interior lights, game machines, navigation systems, memory cards, pacemakers, hearing aids, medical devices, toys, robots, road conditioners, and traffic lights. Battery packs of according to the present invention can also be used as driving power sources or auxiliary power sources for those electric power consumption devices. Alternatively, battery packs according to the present invention can be applied to apparatuses such as power sources of power storage units for buildings such as residential houses or for power generation facilities, or can be used for supplying power to those apparatuses or as electric storage devices in so-called smart grids. Such electric storage devices not only supply power but also can store power by receiving power supplies from other power sources. Further, battery packs according to the present invention can be incorporated into home energy management systems (HEMSs) and building energy management systems (BEMSs). As power sources for charging the secondary battery cells constituting battery packs, it is possible to use not only commercial power sources, but also various solar cells, fuel cells, thermal power generation facilities, nuclear generation facilities, hydropower generation facilities, wind power generation apparatuses, micro hydro apparatuses, and geothermal power generation apparatuses. It is also possible to use the regenerative energy generated by electric power consumption devices. However, the present invention is not limited to the above.

EXAMPLE 1

Figure 2:
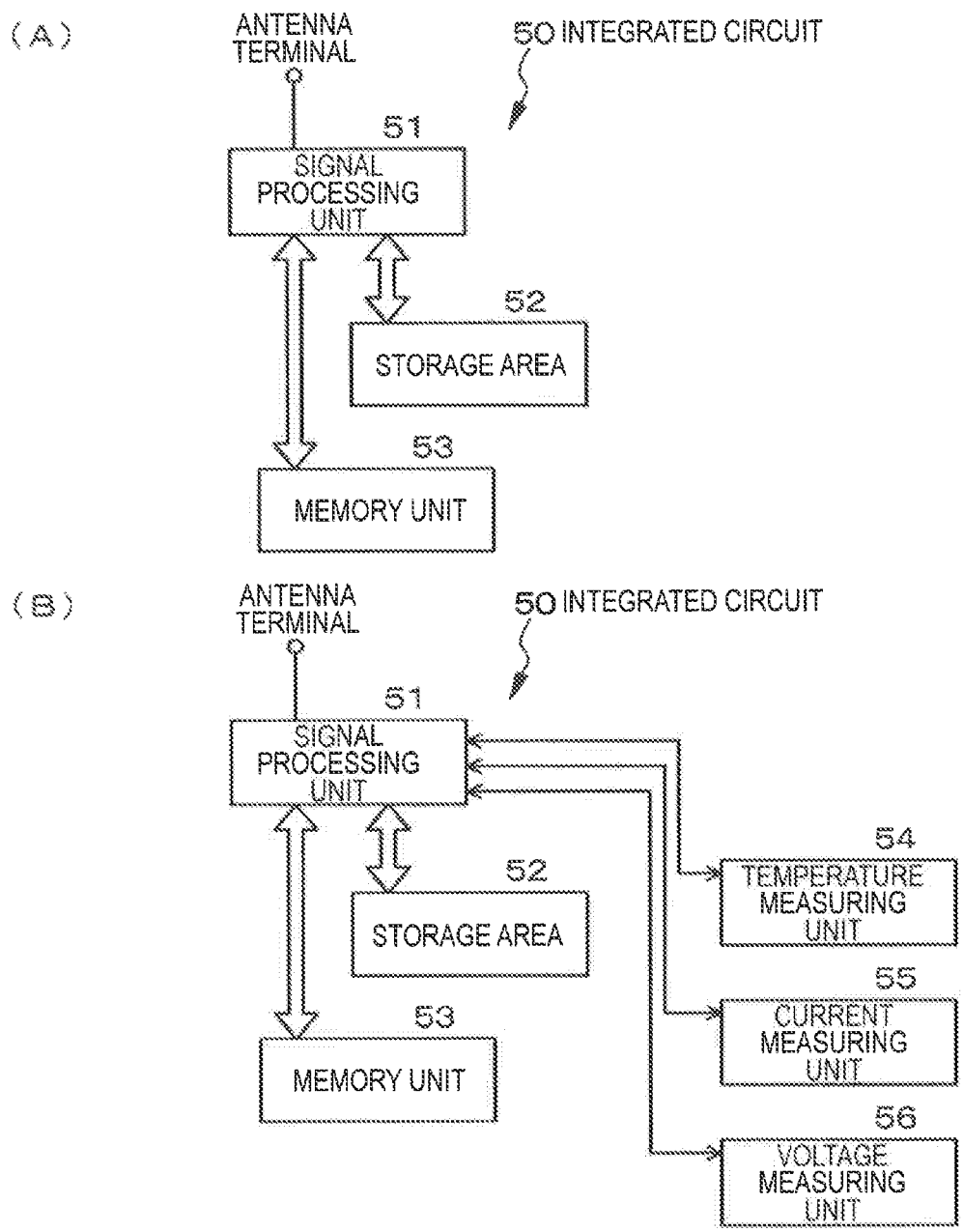
FIGS. 2(A) and 2(B) are block diagrams of integrated circuits in Example 1 and Example 2, respectively.
Figure 3:
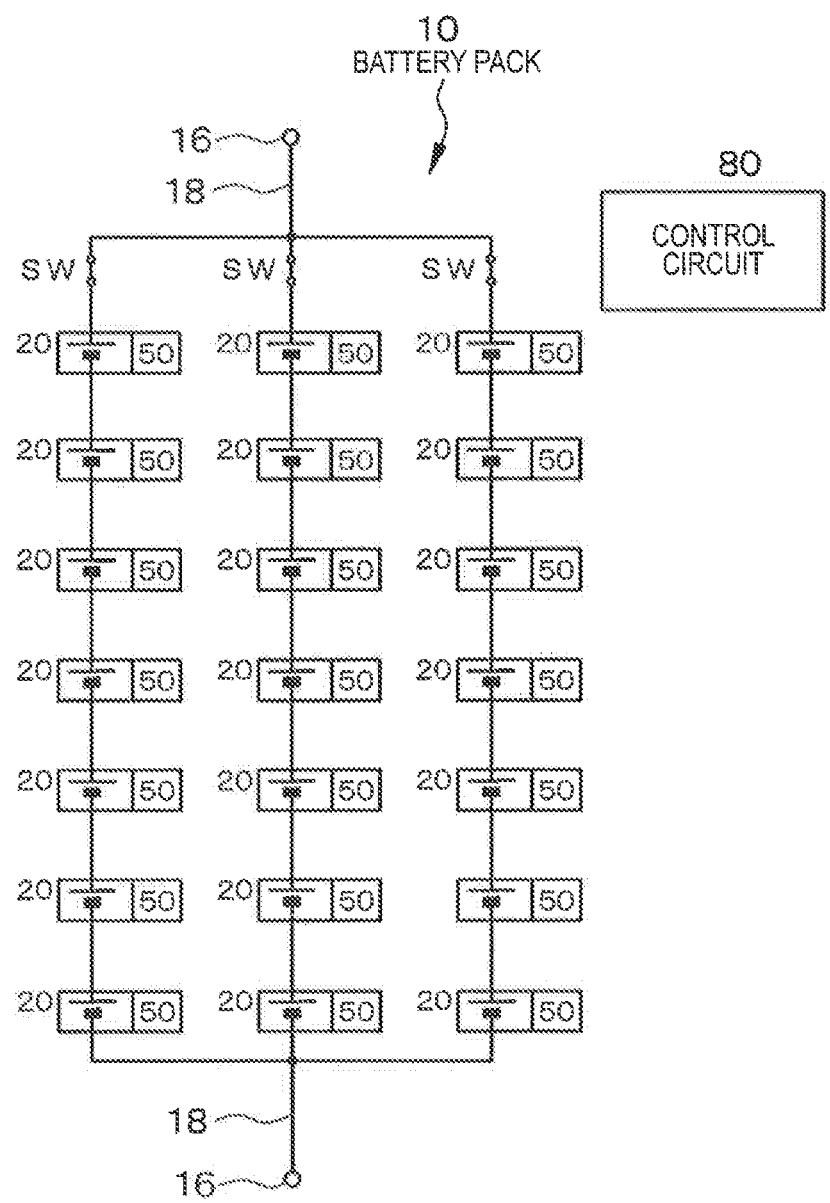
FIG. 3 is a diagram showing a connection state of the secondary battery cells in a battery pack of Example 1.
Figure 4:
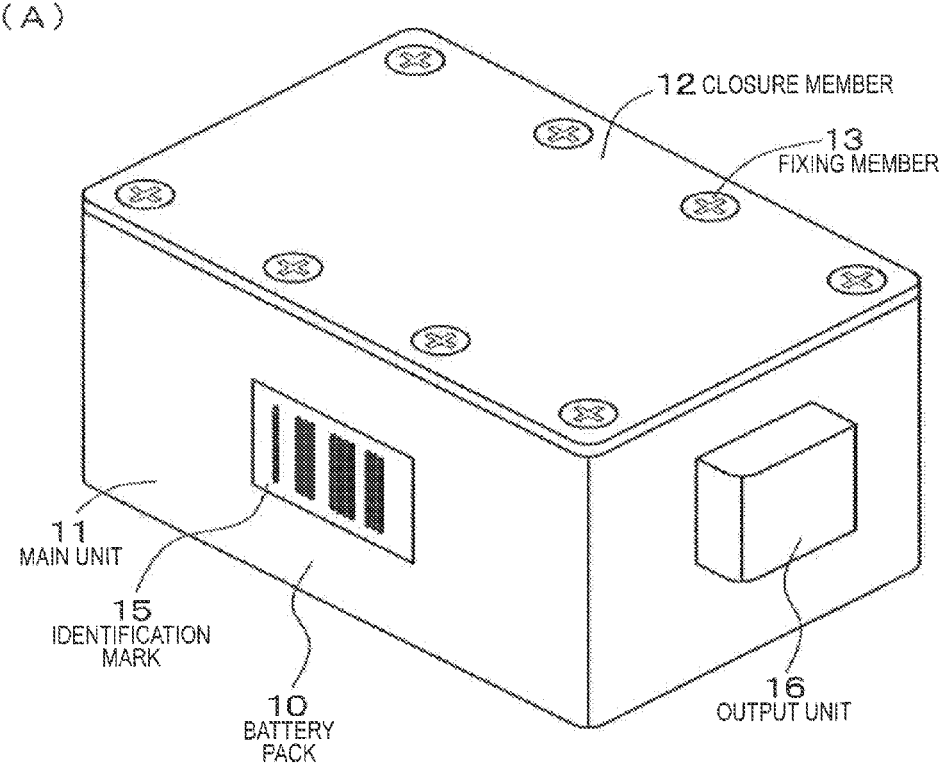
FIG. 4(A) is a schematic perspective view of a battery pack.
FIG. 4(B) is a schematic view showing a situation where the lid is removed from the battery pack.
Figure 4:
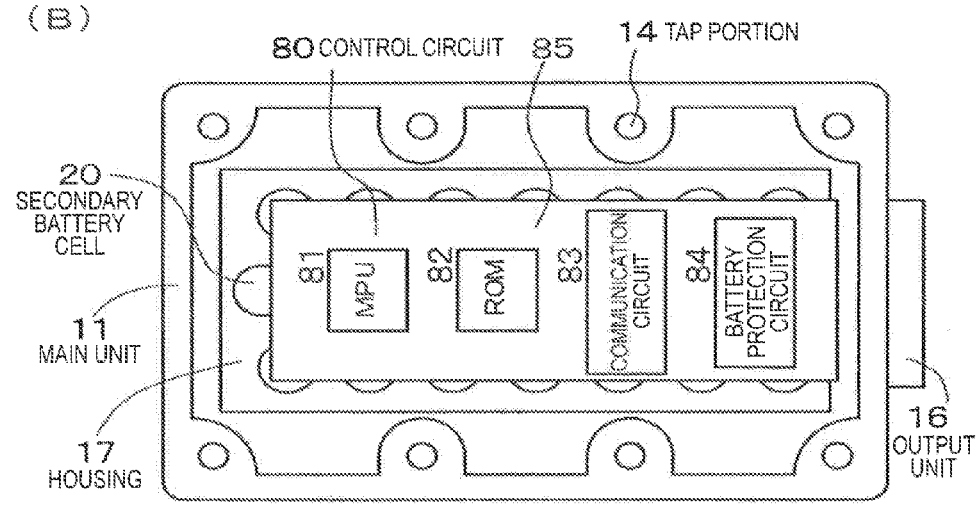

Example 1 relates to a secondary battery cell, a battery pack, and an electric power consumption device of the present invention. FIG. 1 shows a schematic end view of the secondary battery cell of Example 1. FIG. 2(A) is a block diagram of an integrated circuit in Example 1. FIG. 3 shows a connection state of the secondary battery cell. FIGS. 4(A) and 4(B) are a schematic perspective view of a battery pack, and a schematic view of the battery pack without the lid.

Each secondary battery cell 20 of Example 1 and Examples 2 through 9 described later includes an integrated circuit (an IC chip) 50 storing identification information, and the integrated circuit 50 is driven by power from the secondary battery cell 20. Specifically, the identification information is an identification number (an ID number) allotted to the integrated circuit 50.

As shown in the block diagram of the integrated circuit 50 of Example 1 in FIG. 2(A), the integrated circuit 50 in Examples 1 through 9 includes a signal processing unit 51 that processes input/output signals, a storage area 52 formed with a RAM, and a memory unit 53 necessary for storing identification information and individual information and for processing various operations. The storage area 52 stores the presence or absence of power supplied from the secondary battery cell 20. Specifically, the storage area 52 formed with a RAM consists of bits including a flag area storing the presence or absence of power supplied from the secondary battery cell 20, and an error detection bit area for the flag region. Further, the memory unit 53 of the integrated circuit 50 stores the identification information and individual information. Here, the individual information is the identification number (the ID number) and authentication number allotted to each secondary battery cell 20. The individual information may further include one or a combination of the names of the manufacturer and the distributor of the secondary battery cell 20, the model number, rating, and specification of the secondary battery cell, and the authentication key of the secondary battery cell.

Each battery pack 10 of Example 1 and Examples 2 through 9 described later includes secondary battery cells 20 of Example 1. That is, the battery pack 10 of Example 1 includes secondary battery cells 20 each including the integrated circuit (IC chip) 50 storing the identification information, and the integrated circuit 50 is driven by the power from the secondary battery cell 20. Although the connection state of the secondary battery cells 20 (the state of an assembled battery) is not limited in each battery pack 10 of Example 1 and Examples 2 through 9 described later, the secondary battery cells 20 are connected in series, and the series-connected units are connected in parallel, as shown in FIG. 3. More specifically, in this battery pack 10, seven secondary battery cells 20 are connected in series, and three series-connected units formed with the groups of the secondary battery cells connected in series are connected in parallel. The secondary battery cells 20 are housed in a housing 17 made of a plastic material such as ABS resin. The series-connected units are connected to a power line 18 for supplying power to the outside, and the power line 18 is connected to an output unit 16 that will be described later.

Each battery pack 10 of Example 1 and Examples 2 through 9 described later further includes a control circuit (a control device) 80. The control circuit 80 determines whether each integrated circuit is detached from each corresponding secondary battery cell (authenticates each integrated circuit), and authenticates each secondary battery cell 20, based on the identification information supplied from the integrated circuits 50 provided for the respective secondary battery cells 20, and further on the individual information where necessary. The control circuit 80 is formed with a circuit including a MPU 81, and a storage means 82 formed with an EEPROM, for example. The control circuit 80 also includes a communication circuit 83 that receives the identification information from the integrated circuits 50 and exchanges information with the integrated circuits 50, so as to send control signals to the secondary battery cells 20 at predetermined time intervals. A charge/discharge control circuit that controls charging and discharging of the secondary battery cells 20 is further incorporated in the control circuit 80. The storage means 82 of the control circuit 80 stores identification information, and the control circuit 80 compares the identification information with the identification information supplied from the integrated circuits 50. The storage means 82 of the control circuit 80 further stores individual information, and the control circuit 80 compares the individual information with the individual information supplied from the integrated circuits 50. The power source of the control circuit 80 is the secondary battery cells 20 forming the battery pack 10. The control circuit 80 includes a known battery protection circuit 84, and actuates the battery protection circuit 84 to stop the battery pack 10 from functioning, where necessary. Specifically, the battery protection circuit 84 is formed with a fuse, and this battery protection circuit 84 is activated to stop the battery pack 10 from functioning. That is, under the control of the MPU 81, the fuse is melted. Alternatively, an over-discharge prevention switch and an overcharge prevention switch provided in the battery protection circuit 84 may be stopped from functioning. However, the battery protection circuit 84 is not limited to such a structure.

Each integrated circuit 50 is provided inside each corresponding secondary battery cell 20, and uses the secondary battery cell 20 as the power source. The integrated circuits 50 transmit information by a wireless method, and the control circuit 80 can obtain the identification information and the like from the integrated circuits 50 without a special-purpose sensing wire. That is, in each secondary battery cell 20 of Example 1, the integrated circuit 50 wirelessly sends the identification information and the individual information to the outside of the secondary battery cell 20 (specifically, to the control circuit 80 provided in the battery pack 10).

In Example 1, each secondary battery cell 20 is a cylindrical secondary battery cell, and is formed with a lithium-ion secondary battery. The configuration and structure of each secondary battery cell 20 may be a known configuration and a known structure. The integrated circuit 50 is placed in a space A existing between an upper insulating plate 32 and a safety valve mechanism 35 that are provided inside the secondary battery cell 20. Alternatively, the integrated circuit 50 may be placed in a space B existing immediately below a battery lid 34.

In the secondary battery cell 20 of Example 1, which is formed with a lithium-ion secondary battery, a wound electrode body 40 around which a positive electrode material 41 and a negative electrode material 42 with a separator 43 interposed in between are wound, and a pair of insulating plate (the upper insulating plate 32 and a lower insulating plate 33) are housed in a cylindrical battery can 31 that is substantially hollow. The separator 43 separates the positive electrode material 41 and the negative electrode material 42 from each other, to let lithium ions to pass while preventing short-circuiting due to contact between the positive electrode material 41 and the negative electrode material 42. The battery can 31 is formed with iron plated with nickel. One end of the battery can 31 is closed, and the other end is open and forms an open end portion. The pair of insulating plates 32 and 33 sandwich the wound electrode body 40, and are positioned perpendicularly to the wound circumferential surface.

The battery lid 34, and the safety valve mechanism 35 and a thermal resistor element (a PTC element) 36 that are provided on the inside of the battery lid 34 are attached to the open end portion of the battery can 31 by caulking with a gasket 37, and the inside of the battery can 31 is hermetically sealed. The battery lid 34 is made of the same material as the battery can 31, for example. The safety valve mechanism 35 is electrically connected to the battery lid 34 via the thermal resistor element 36. In the safety valve mechanism 35, when the inner pressure becomes equal to or higher than a certain level due to internal short-circuiting or heating from outside or the like, a disk plate 35A is reversed so that the electrical connection between the battery lid 34 and the wound electrode body 40 is cut off. The thermal resistor element 36 has resistance that increases with temperature, so as to restrict the current flow and prevent abnormal heat generation caused by a large current. The gasket 37 is made of an insulating material, for example, and has asphalt applied to the surface thereof.

A center pin 44 is inserted into the center of the wound electrode body 40. In this wound electrode body 40, a positive electrode lead 45 made of aluminum or the like is connected to the positive electrode material 41, and a negative electrode lead 46 made of nickel or the like is connected to the negative electrode material 42. The positive electrode lead 45 is welded to the safety valve mechanism 35, and thus is electrically connected to the battery lid 34. Meanwhile, the negative electrode lead 46 is welded to the battery can 31.

The integrated circuit 50 is connected between the positive electrode and the negative electrode of the secondary battery cell 20. Specifically, the integrated circuit 50 is connected to the positive electrode lead 45 and the battery can 31 via a wire 58. The wire 58 connecting the integrated circuit 50 and the battery can 31 maintains the sealed state with the gasket 37, though not shown in the drawings. The integrated circuit 50 is also connected to the battery lid 34 of the secondary battery cell 20 with a wire (not shown), and uses the battery lid 34 as an antenna. In some cases, the integrated circuit 50 may have an independent antenna.

The lithium-ion secondary battery is manufactured in the following manner, for example.

First, the positive electrode material 41 and the negative electrode material 42 are formed by a known method. The positive electrode lead 45 is welded to the positive electrode material 41, and the negative electrode lead 46 is welded to the negative electrode material 42. After that, the positive electrode material 41 and the negative electrode material 42 having the separator 43 interposed in between are wound to form the wound electrode body 40. The end portion of the positive electrode lead 45 is welded to the safety valve mechanism 35, and the end portion of the negative electrode lead 46 is welded to the battery can 31. The wound electrode body 40 sandwiched by the pair of insulating plates 32 and 33 is then housed in the battery can 31. An electrolytic solution is then injected into the battery can 31, so that the separator 43 is impregnated with the electrolytic solution. Lastly, the battery lid 34, the safety valve mechanism 35, and the thermal resistor element 36 are secured to the open end portion of the battery can 31 by caulking with the gasket 37. In this manner, the lithium-ion secondary battery shown in FIG. 1 can be completed.

In the battery pack 10 of Example 1, 21 secondary battery cells 20 are housed in a housing portion formed in the housing 17. Once all the secondary battery cells 20 are housed in the housing portion, the housing 17 is placed in the main unit 11 of the battery pack 10, and a printed wiring board 85 having the MPU 81 and the like formed thereon is attached to the main unit 11 by an appropriate technique (see FIG. 4(B)). A closure member (specifically, a lid) 12 is placed on the main unit 11, and fixing members (such as screws) 13 are then screwed into securing portions (such as bushes having tap portions 14) provided in the main unit 11. Reference numeral 15 indicates an identification mark (a serial ID or a bar code) attached to a sidewall of the main unit 11, and the output unit 16 is provided on another sidewall of the main unit 11. The main unit 11 can have any shape, and is a rectangular parallelepiped in Example 1. An opening for taking the secondary battery cells 20 in and out of the main unit 11 is formed in the top surface of the main unit 11, and the closure member 12 closes this opening. However, the opening may be formed in a side surface of the main unit 11, or in the bottom surface of the main unit 11.

After the assembling of the battery pack 10 is completed, various kinds of information (data) are initialized. That is, the identification information and individual information about all the secondary battery cells 20 are associated with the positions of the secondary battery cells 20 in the housing 17, and the control circuit 80 stores the identification information and individual information into the storage means 82. Alternatively, the control circuit 80 stores the identification information and individual information about all the secondary battery cells 20 into the storage means 82 by a polling method. The identification information is stored beforehand in the memory unit 53 of each integrated circuit 50. Under the control of the control circuit 80, the individual information is stored into the memory unit 53 of each integrated circuit 50. Also, under the control of the control circuit 80, information indicating the "presence of a power supply" supplied from the secondary battery cells 20 is stored into the flag areas of the storage areas 52 of the integrated circuits 50, and appropriate data is written into the error detection bit areas corresponding to the flag areas. The information indicating "presence of a power supply" is also stored into the storage means 82 of the control circuit 80.

Based on the positional information about the secondary battery cells 20 in the housing 17, the control circuit 80 wirelessly sends, at predetermined time intervals, a command to inquire the identification information of each integrated circuit 50 provided for the secondary battery cells 20, specifically, via the communication circuit 83. The signal processing unit 51 of each integrated circuit 50 that has received this command sends the identification information and individual information stored in the memory unit 53, and the information stored in the flag area of the storage area 52, to the control circuit 80. The control circuit 80 that has received the identification information and individual information, and the information stored in the flag area then determines whether the information stored in the flag area corresponds to the "presence of a power supply". If the information does not correspond to the "presence of a power supply", or an integrated circuit is not authenticated, the integrated circuit 50 is determined to have been detached from the secondary battery cell 20. The user of the battery pack 10 then receives a warning, and, in some cases, the power output from the battery pack 10 is stopped. If the information corresponds to the "presence of a power supply", on the other hand, the control circuit 80 determines whether the received identification information and individual information match the identification information and individual information stored in the storage means 82. Such operations and processing are sequentially performed on all the secondary battery cells 20. If there is an identification information mismatch, or there is an individual information mismatch though there is an identification information match, or if authentication is not obtained, the control circuit 80 determines that there is an unauthorized exchange of secondary battery cells 20 in the battery pack 10, gives a warning or the like to the user of the battery pack 10, and, in some cases, stops the power output from battery pack 10. If the information stored in the flag area does not correspond to the "presence of a power supply", the signal processing unit 51 of the integrated circuit 50 that has received the above described, command may not respond to the command. If there is no response to the command, the control circuit 80 determines that the integrated circuit 50 is detached from the secondary battery cell 20, gives a warning or the like to the user of the battery pack 10, and, in some cases, may stop the power output from the battery pack 10.

When the power supply from a secondary battery cell 20 to the corresponding integrated circuit 50 is stopped, or more specifically, when the integrated circuit 50 is detached from the secondary battery cell 20, the data (such, as information indicating the "presence of a power supply") stored in the storage area 52 (to be specific, the flag area and the error detection bit area) is lost, and random information (data) is stored when the power supply from the secondary battery cell 20 to the integrated circuit 50 is resumed. Accordingly, by checking the information (data) stored in the storage area 52, the control circuit 80 can accurately determine that the integrated circuit 50 is detached from the secondary battery cell 20 as described above.

Since the integrated circuit 50 provided for each secondary battery cell 20 stores not only the identification information but also the individual information such as the identification number and the authentication number allotted to the secondary battery cell 20, the control circuit 80 can easily identify each secondary battery cell 20, and can easily and accurately determine whether each secondary battery cell is an authorized legitimate secondary battery cell. The power source is each secondary battery cell 20, and, information is transmitted by a wireless method. The integrated circuits 50 can be driven without a special-purpose sensing wire, and the overall configuration of the battery pack 10 can be simplified.

Normally, when the discharge voltage of the secondary battery cells 20 becomes a certain value or lower, the power output from the battery pack is stopped. Even in such a situation, the secondary battery cells 20 still have sufficient power to drive the control circuit 80 and the integrated circuits 50, and cause no problems. However, if the battery pack is left for a long period of time, the secondary battery cells 20 might lose the power necessary for driving the control circuit 80 and the integrated circuits 50. In such a case, the battery pack should be recharged, and the various kinds of information (data) in the battery pack should be initialized by the manufacturer or the like of the battery pack.

The battery pack 10 can be applied to electric power consumption devices such as electric vehicles (including hybrid cars), golf carts, electric carts, electric motorcycles, power-assisted bicycles, and railroad cars. That is, an electric power consumption device includes a battery pack 10 that includes secondary battery cells 20 each having an integrated circuit 50 with a measuring function to measure the battery state. To drive a converter (more specifically, a motor, for example) that is provided in such an electric power consumption device and converts supplied electric power into a driving force, the battery pack 10 is made to discharge. Also, the battery pack 10 can be charged by using the regenerated energy supplied from such a device. Those electric power consumption devices each include a control device including a remaining battery level indicator, and a control device that processes information about the control on the electric power consumption device, based on the information about the secondary battery cells 20.

EXAMPLE 2

Example 2 is a modification of Example 1. In a secondary battery cell 20 of Example 2, an integrated circuit (an IC chip) 50 has a measurement function to measure a battery state (battery information). The integrated circuit 50 wirelessly sends the measured battery state to the outside of the secondary battery cell 20 (to be specific, to a control circuit 80). That is, the integrated circuit 50 is wirelessly connected to the control circuit 80 provided in a battery pack 10, and the battery state of the integrated circuit 50 is wirelessly sent to the control circuit 80.

In Example 2, the battery state to be measured by the integrated circuit 50 is at least one type of physical quantity selected from the group consisting of battery temperature, battery current, and battery terminal voltage, and more specifically, is the three types of physical quantities: battery temperature, battery current, and battery terminal voltage. However, the battery state is not limited to the above, and may indicate only battery temperature, only battery current, only battery terminal voltage, battery temperature and battery current, battery temperature and battery terminal voltage, or battery current and battery terminal voltage. To measure battery temperature, the integrated circuit 50 has a pn junction area. Also, to measure battery current, a known current measuring circuit (specifically, a current measuring circuit formed with a combination of a reference voltage generating circuit, a resistor, and an AD converter, a combination of a shunt resistor, an operational amplifier, and an AD converter, a current transformer, a Hall-element current sensor, or a combination of a magnetic resonance current sensor, an operational amplifier, and an AD converter, for example) is provided in the integrated circuit 50. To measure battery terminal voltage, a known voltage measuring circuit (specifically, a voltage measuring circuit formed with a combination of a reference voltage generating circuit, a resistance voltage divider, and an AD converter, or a combination of an operational amplifier and an AD converter, for example) is provided in the integrated circuit 50.

As shown in a block diagram of the integrated circuit 50 of Example 2 in FIG. 2(B), the integrated circuit 50 includes not only a signal processing unit 51 that processes input/output signals, a storage area 52, and a memory unit 53 necessary for storing individual information and for processing various operations, but also a temperature measuring unit (a temperature measuring circuit) 54 that measures battery temperature, a current measuring unit (a current measuring circuit) 55 that measures battery current, and a voltage measuring unit (a voltage measuring circuit) 56 that measures battery terminal voltage. It should be noted that not all the temperature measuring unit 54, the current measuring unit 55, and the voltage measuring unit 56 need to be mounted on the integrated circuit 50, and only selected functions may be mounted depending on the intended use. To measure current and voltage, the current measuring unit 55 and the voltage measuring unit 56 of the integrated circuit 50 are connected to the positive electrode lead 45 and the battery can 31 via the wire 58.

Based on an instruction issued from the control circuit 80 at second predetermined time intervals, the integrated circuit 50 measures the battery state of the secondary battery cell 20, and transmits the measured battery state, so that the control circuit 80 can receive and recognize the battery state. Based on the received battery state, the control circuit 80 determines whether there is an abnormality in the secondary battery cell 20. Such operations and processing are sequentially performed on all the secondary battery cells 20. If there is an abnormality in the secondary battery cell 20, or if there is an abnormal temperature rise in the secondary battery cell 20, there is an abnormal current flow in the secondary battery cell 20, or there is an abnormal voltage value change in the secondary battery cell 20, a switch SW provided in the series-connected unit is turned off under the control of the control circuit 80, and the series-connected unit containing the secondary battery cell 20 having the abnormality is detached from the battery pack 10. In some cases, the power output from the battery pack 10 may be stopped. A warning that there is an abnormality in the secondary battery cell is then given to the user of the battery pack 10. If there is an abnormality in the integrated circuit 50, and communication is disabled, it is preferable to take the same measures as above.

As described above, in a secondary battery cell, the battery pack 10, or an electric power consumption device of Example 2, the integrated circuit 50 in the secondary battery cell 20 has a measurement function to measure the battery state. Accordingly, the secondary battery cell 20 can collect information about the battery state thereof, and the entire configuration of the battery pack can be simplified. It should be noted that the integrated circuit of Example 2 can be applied to each of the following examples.

EXAMPLE 3

Figure 5:
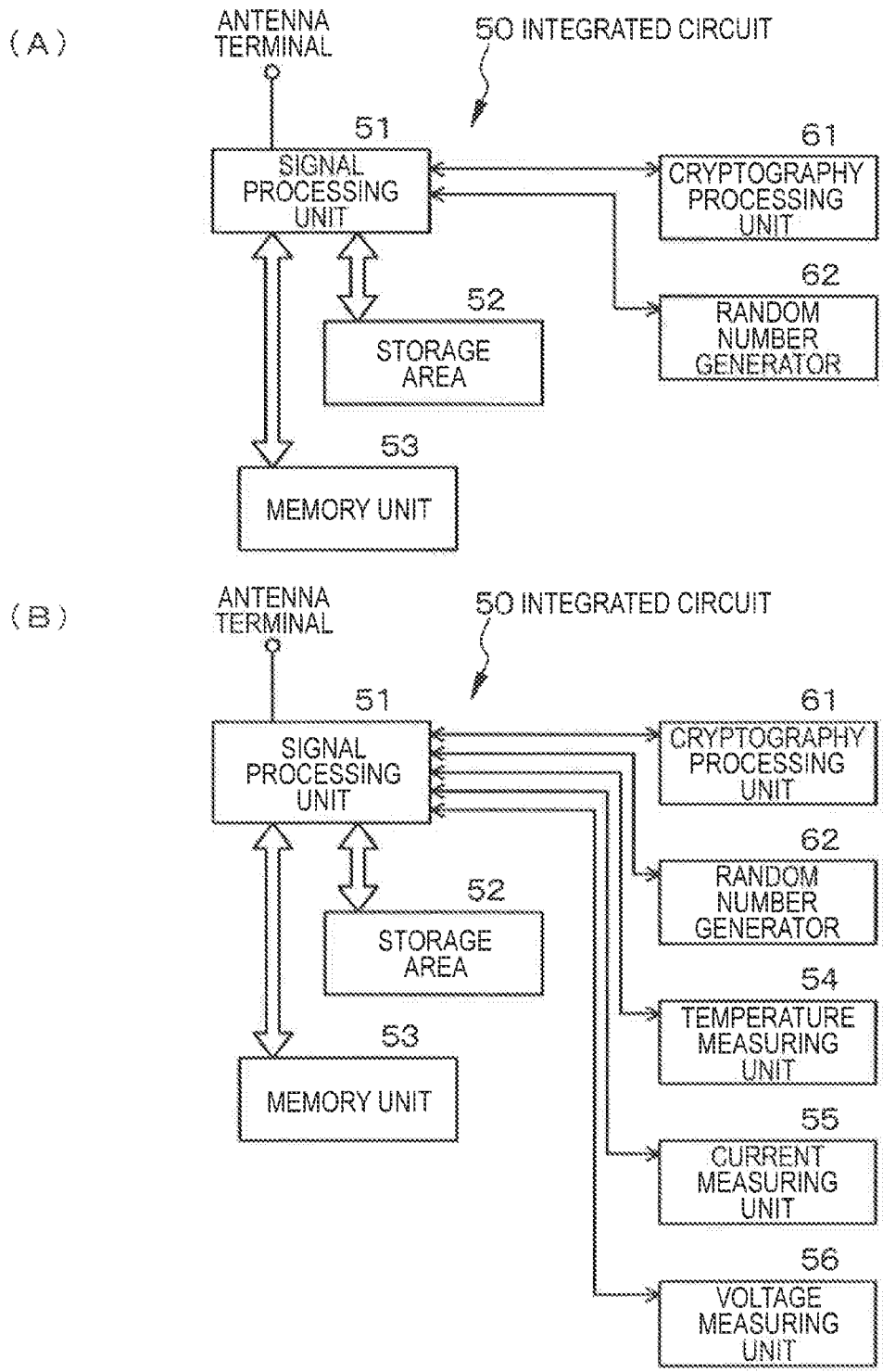
FIGS. 5(A) and 5(B) are block diagrams of integrated circuits in Example 3 and a modification thereof, respectively.

Example 3 is a modification of Example 1. In Example 3, the various kinds of information, identification information, and the like stored in each integrated circuit 50 are encrypted. Specifically, as shown in a block diagram of an integrated circuit 50 in FIG. 5(A), the integrated circuit 50 further includes a cryptography processing unit 61 and a random number generator 62. The cryptography processing unit 51 and the random number generator 62 can be a known cryptography processing unit and a known random number generator, and therefore, detailed explanation thereof is not provided herein. Also, secondary battery cells, a battery pack, and an electric power consumption device that are the same as the secondary battery cells, the battery pack, and the electric power consumption device of Example 1 or 2 can be used, and therefore, detailed explanation thereof is not provided herein. In Example 3, the various kinds of information, identification information, and the like stored in each integrated circuit 50 are encrypted, and accordingly, it is difficult for a third party to understand the information. It should be noted that communication pathways may be encrypted likewise. As described above, the integrated circuit of Example 3 can also be combined with the integrated, circuit described in Example 2, as shown in a block diagram in FIG. 5(B). Also, the integrated circuit of Example 3 can be applied to each of the following examples.

EXAMPLE 4

Figure 6:
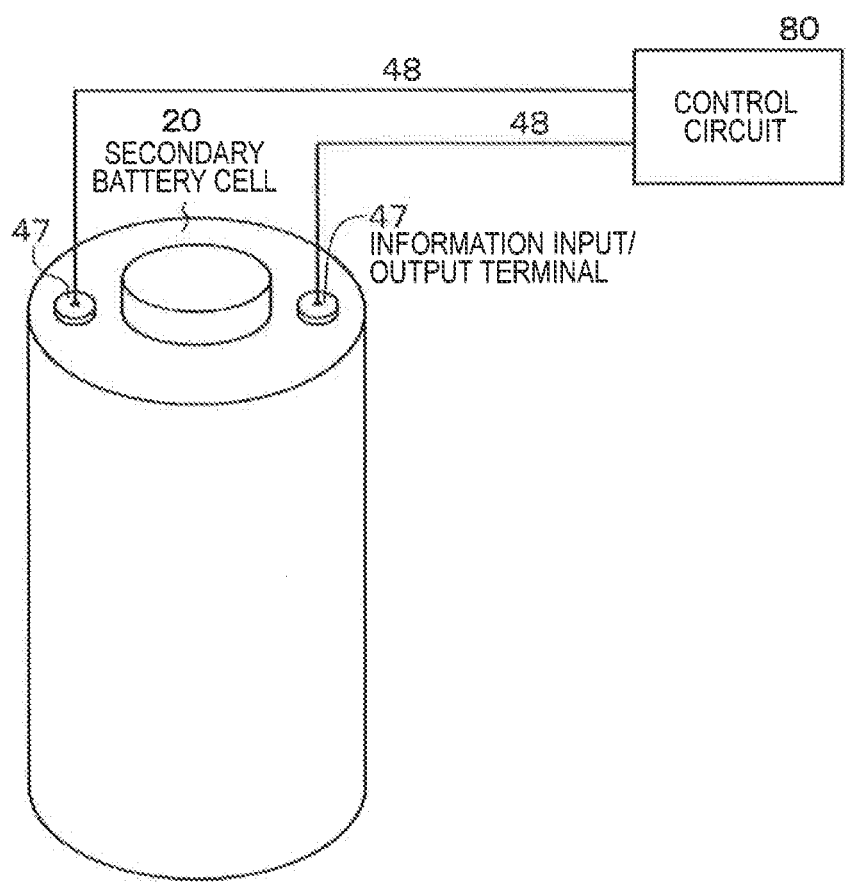
FIG. 6 is a schematic perspective view of a secondary battery cell of Example 4.
Figure 7:
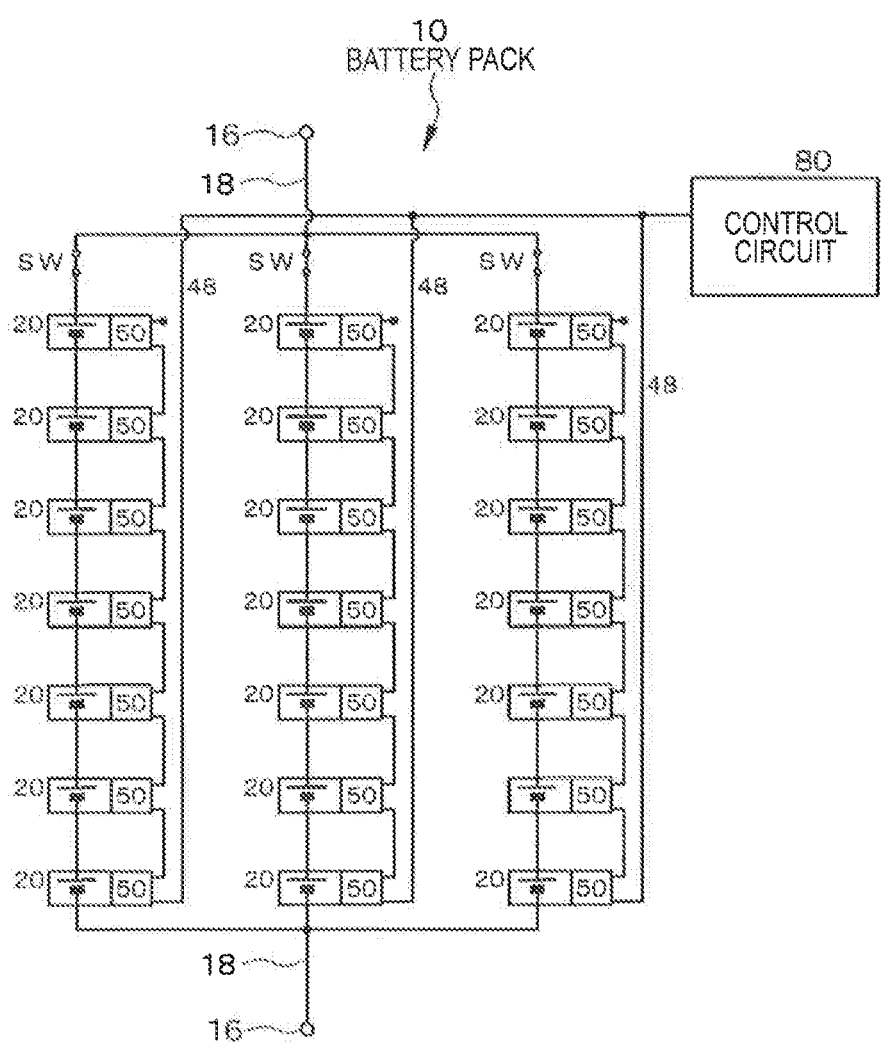
FIG. 7 is a diagram showing a connection state of the secondary battery cells in a battery pack of Example 4.

Example 4 is a modification of each of the integrated circuits described in Examples 1 through 3, but in Example 4, the secondary battery cells 20 in a battery pack 10 are in the connection state shown in FIG. 7 (the state of an assembled battery), and each integrated circuit 50 sends identification information and the like to the outside of the secondary battery cells 20 (specifically, to a control circuit 80) in a wired manner. As shown in a schematic perspective view of a secondary battery cell in FIG. 6, information input/output terminals 47 are provided on the secondary battery cell 20, and the integrated circuit (not shown) provided inside the secondary battery cell 20 is connected to the control circuit 80 via the information input/output terminals 47 and wires (sensing wires) 48. As in Example 1, the integrated circuit is connected between the positive electrode and the negative electrode of the secondary battery cell.

Except for the above mentioned aspects, the battery pack and secondary battery cells of Example 4 have the same configurations and structures as the battery pack and secondary battery cells described in Example 1, and therefore, detailed explanation thereof is not provided herein. In Example 4, a so-called cascade connection method is used as the connection method for the integrated circuits 50, and the integrated circuits are sequentially authenticated. Also, the battery state is measured in the same manner as in Example 3, where necessary. Accordingly, the identification information and the like, and the battery states of all the secondary battery cells in the battery pack can be sensed by a small number of sensing wires, and there is no need to use complicated sensing wires. Also, based on the positional information about the secondary battery cells 20 in a housing 17, the control circuit 80 sends a command at predetermined time intervals, to inquire the identification information via the wires 48. Except for the above aspects, the operations and processing for authentication can be the same as those in Example 1, and therefore, detailed explanation thereof is not provided herein. In Example 4, the sensing wires can be simplified in the entire battery pack, the number of connecting points with the control circuit 80 can be reduced, and the reliability of the battery pack can be increased. In some cases, the control circuit may be connected to the respectively secondary battery cells independently of one another.

EXAMPLE 5

Example 5 is a modification of Example 4. In Example 4 described above, the integrated circuit (not shown) provided, inside each secondary battery cell 20 is connected to the control circuit 80 via the information input/output terminals 47 at two locations and the two wires (the sensing wires) 48.

Figure 16:
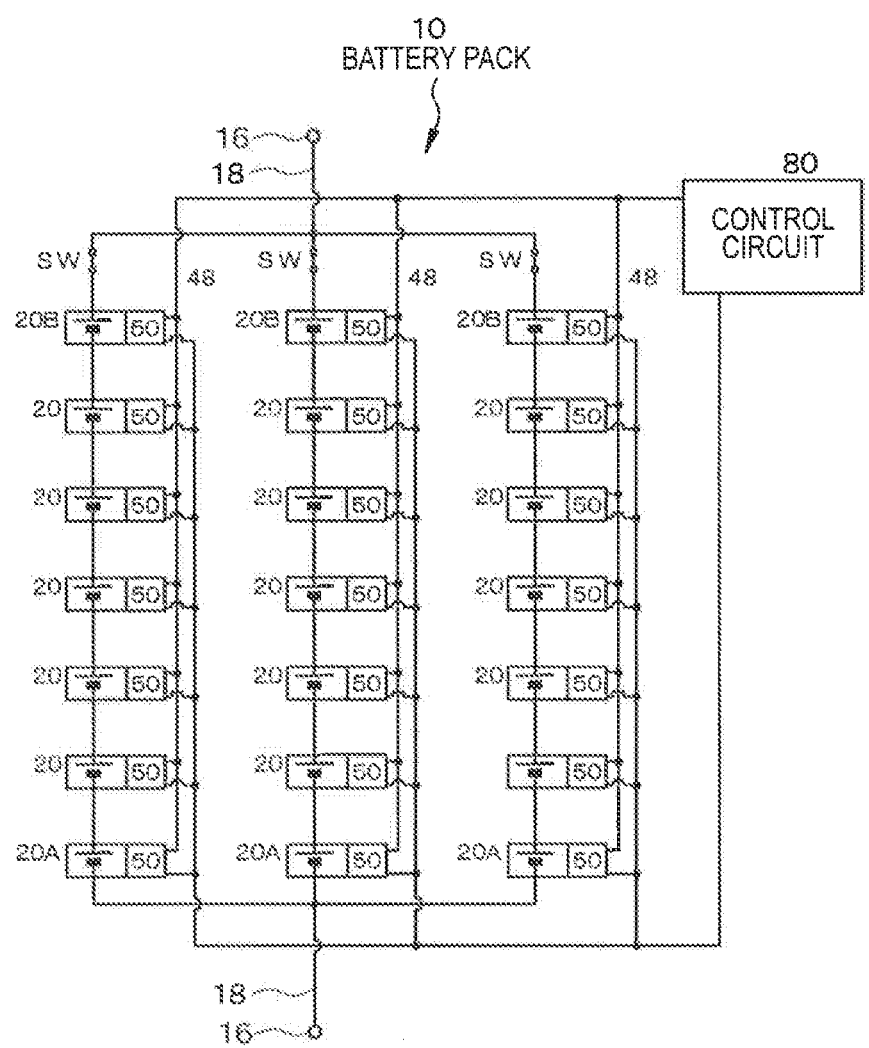
FIG. 16 is a diagram showing a connection state of the secondary battery cells in an embodiment of a conventional battery pack.

In a case where a so-called bus connection method is used as the connection method for the integrated circuits 50 in an embodiment of the connection state of the secondary battery cells 20 in a conventional battery pack 10 (the state of an assembled battery) as shown in FIG. 16, secondary battery cells 20A and secondary battery cells 20B in FIG. 16 have a large difference in the voltage value of the direct-current component of a signal output from the integrated circuit 50 to the control circuit 80 via the wires (the sensing wires) 48, for example. Therefore, when the integrated circuit 50 sends identification information and the like to the outside of the secondary battery cell 20 (specifically, to the control circuit 80) in a wired manner, the width of voltage value to be input to the control circuit 80 becomes greater, and the withstanding voltage of the various circuits constituting the control circuit 80 needs to be made higher, for example.

Figure 8:
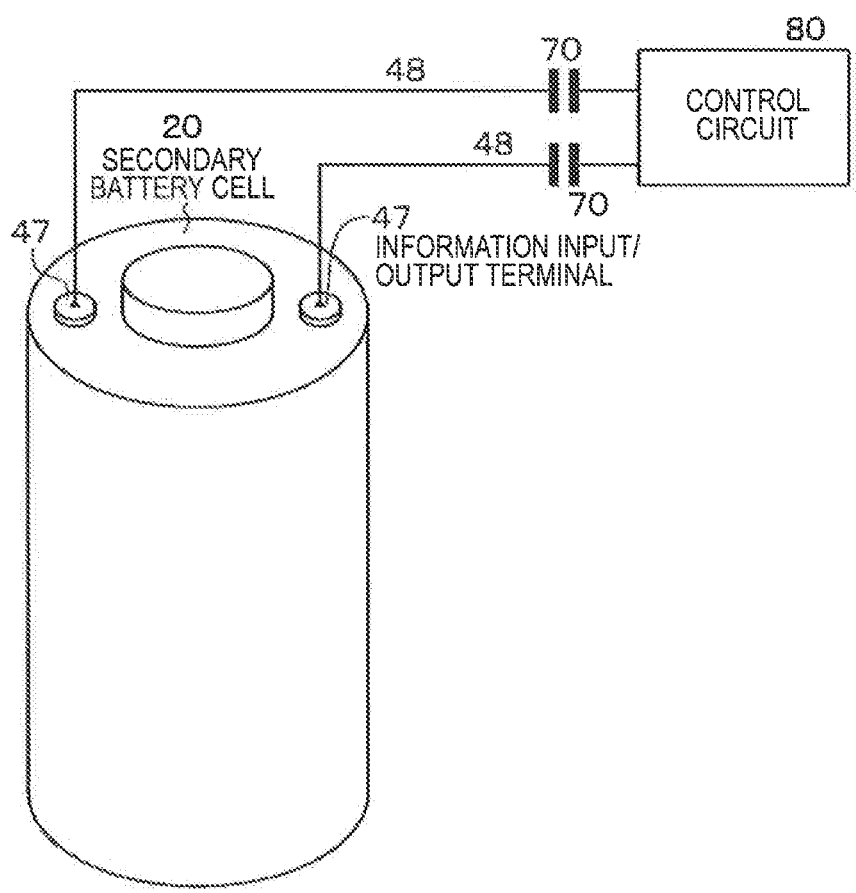
FIG. 8 is a schematic perspective view of a secondary battery cell of Example 5.
Figure 9:
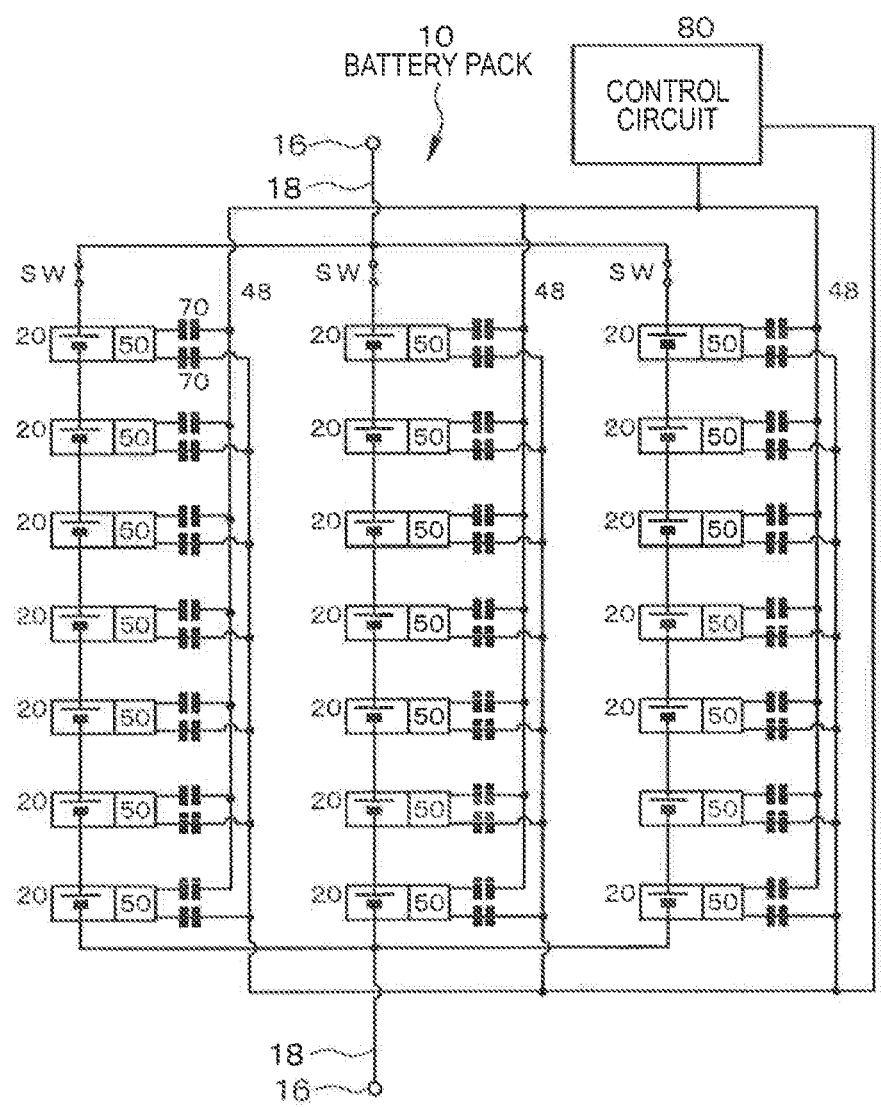
FIG. 9 is a diagram showing a connection state of the secondary battery cells in a battery pack of Example 5.

To avoid such a problem, the connection state of the secondary battery cells 20 in a battery pack 10 (the state of an assembled battery) in Example 5 is as shown in FIG. 9, and each integrated circuit 50 is connected by a bus connection method as shown, in a schematic perspective view of a secondary battery cell 20 in FIG. 8. The control circuit 80 receives the identification information and the like from each integrated circuit 50 provided for the secondary battery cells 20, based on capacitive couplings 70. With the capacitive couplings 70, the direct-current components are removed from the signals that are output from the integrated circuits 50 to the control circuit 80 via the wires (the sensing wires) 48. Accordingly, the control circuit 80 is not required to have a high withstanding voltage.

The capacitive couplings 70 may be formed in the communication circuit 83 in the control circuit 80, may be formed independently in the control circuit 80, may be formed in the signal processing unit 51 in the integrated circuit 50, may be formed independently in the integrated circuit 50, or may be placed (formed) between the integrated circuit 50 and the control circuit 80. Specifically, a capacitor (a capacitive unit) including two conductor layers (wires or electrodes or the like provided in the circuit) sandwiching an insulating layer in the circuit is formed, for example.

EXAMPLE 6

Figure 10:
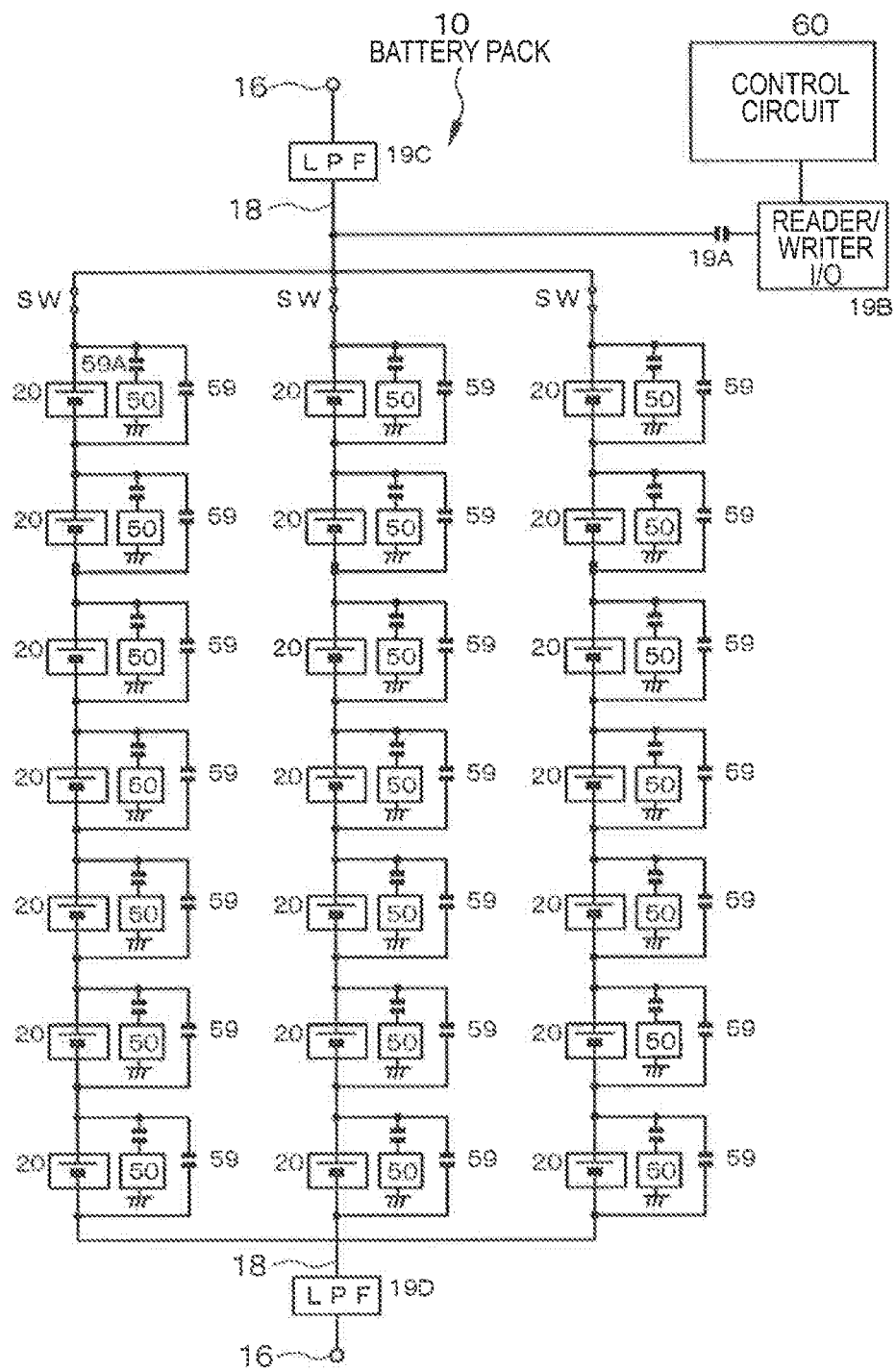
FIG. 10 is a diagram showing a connection state of the secondary battery cells in a battery pack of Example 6.

Example 6 is another modification of Example 4. In Example 4, each integrated circuit 50 is connected to the control circuit 80 via the information input/output terminals 47 and the wires (the sensing wires) 48. In Example 6, on the other hand, the secondary battery cells in a battery pack are in the connection state shown in FIG. 10, and each integrated circuit 50 is connected, via a capacitor 59A, to a power line 18 that is provided in the corresponding secondary battery cell 20 and supplies power to the outside. A coupling capacitor 59 functioning as a bandpass filter (BPF) is provided between the integrated circuit 50 and the power line 18. The coupling capacitor 59 and the secondary battery cell 20 are connected in parallel. The coupling capacitor 59 may be incorporated into the integrated circuit 50, or may be provided separately from the integrated circuit 50, as long as it is designed to pass frequencies suitable as communication frequencies for transmitting the identification information and the like, and the battery state. The control circuit 80 is connected to the power line 18. A coupling capacitor 19A and a reader/writer I/O 19B are provided between the control circuit 80 and the power line 18. The coupling capacitor 19A is also designed to pass frequencies suitable as communication frequencies for transmitting the identification information and the like, and the battery state. Low-pass filters 19C and 19D formed with reactances are provided on the side of the output units 16 of the power line 18, and the identification information and the like, and the battery states cannot pass through the output units 16. In some cases, the low-pass filter 19C and the integrated circuits 50 may be connected to a power line existing on the outside of the output units 16.

As described above, in Example 6, while the secondary battery cells in a battery pack are in a connection state (the state of an assembled battery), the identification information and the like, and the battery state are superimposed on the power line path, and are output to the outside of each secondary battery cell 20 (specifically, to the control circuit 80) by a wired method. Each integrated circuit 50 is connected to the positive electrode lead 45 and the battery can 31 via the wire 58, as in Example 1. Unlike Example 4, this example does not need to provide the information input/output terminals 47 on the secondary battery cells 20, and does not need to provide the wires (the sensing wires) 48, either. Except for the above mentioned aspects, the battery pack and secondary battery cells of Example 6 have the same configurations and structures as the battery pack and secondary battery cells described in Example 1 or 4, and therefore, detailed explanation thereof is not provided herein.

EXAMPLE 7

Figure 11:
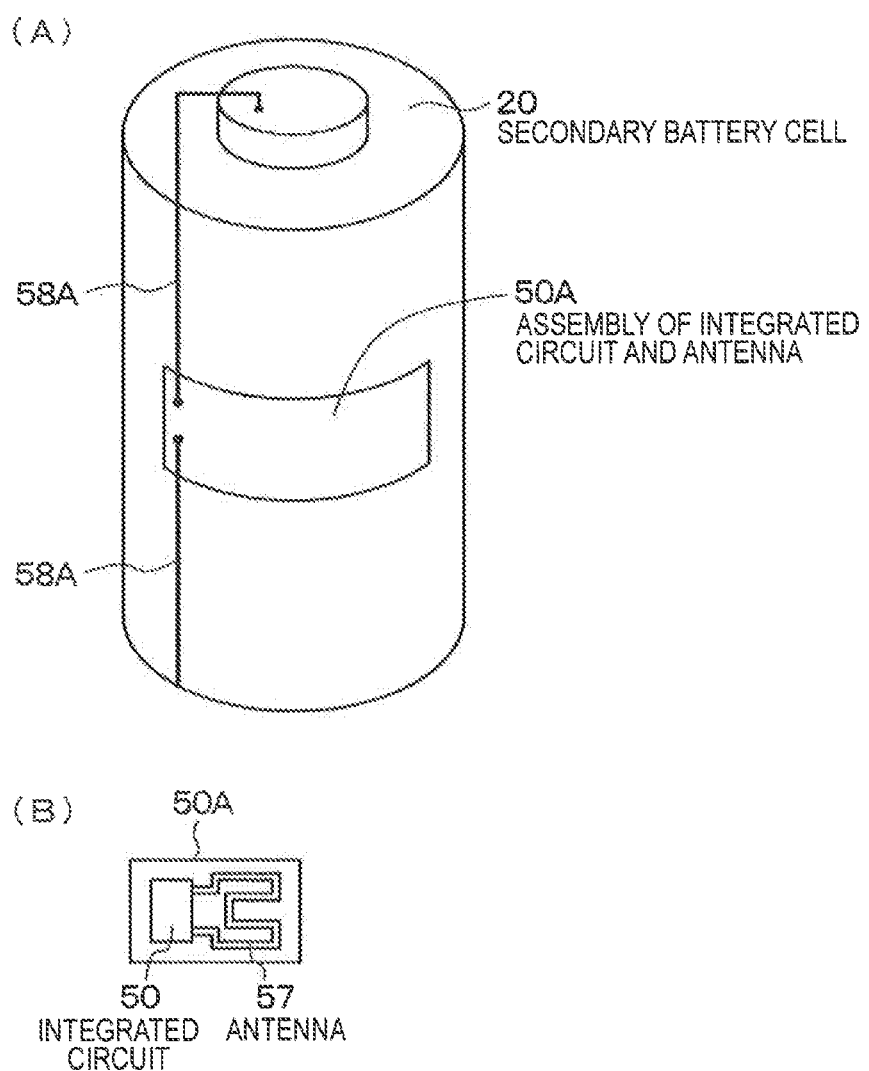
FIG. 11(A) is a schematic perspective view of a secondary battery cell of Example 7.
FIG. 11(B) is a schematic view of an assembly of an integrated circuit and an antenna.

Example 7 is another modification of Example 1. FIG. 11(A) is a schematic perspective view of a secondary battery cell, and FIG. 11(B) is a schematic view of an integrated circuit assembly (a wireless IC tag) 50A that is an assembly of an integrated circuit 50 and an antenna 57. As shown in those drawings, in Example 7, the integrated circuit 50 is provided on the outer surface of the secondary battery cell 20, unlike that of Example 1. Specifically, the integrated circuit 50 is bonded to the outer surface of the secondary battery cell 20, or the integrated circuit 50 is laminated with an appropriate means (such as an exterior film) on the outer surface of the secondary battery cell 20. As in Example 1, the power source of the integrated circuit 50 is the secondary battery cell 20, and information is transmitted by a wireless method. The integrated circuit 50 has the antenna 57. Also, power is supplied from the battery lid 34 and the battery can 31 of the secondary battery cell to the integrated circuit 50 via a wire 58A.

Except for the above mentioned aspects, the battery pack and secondary battery cells of Example 7 have the same configurations and structures as the battery pack and secondary battery cells described in Example 1, and therefore, detailed explanation thereof is not provided herein. As in Example 2, to measure current and voltage, the current measuring unit 55 and the voltage measuring unit 56 of the integrated circuit 50 can be connected to the positive electrode lead 45 and the battery can 31 via the wire 58A.

EXAMPLE 8

Figure 12:
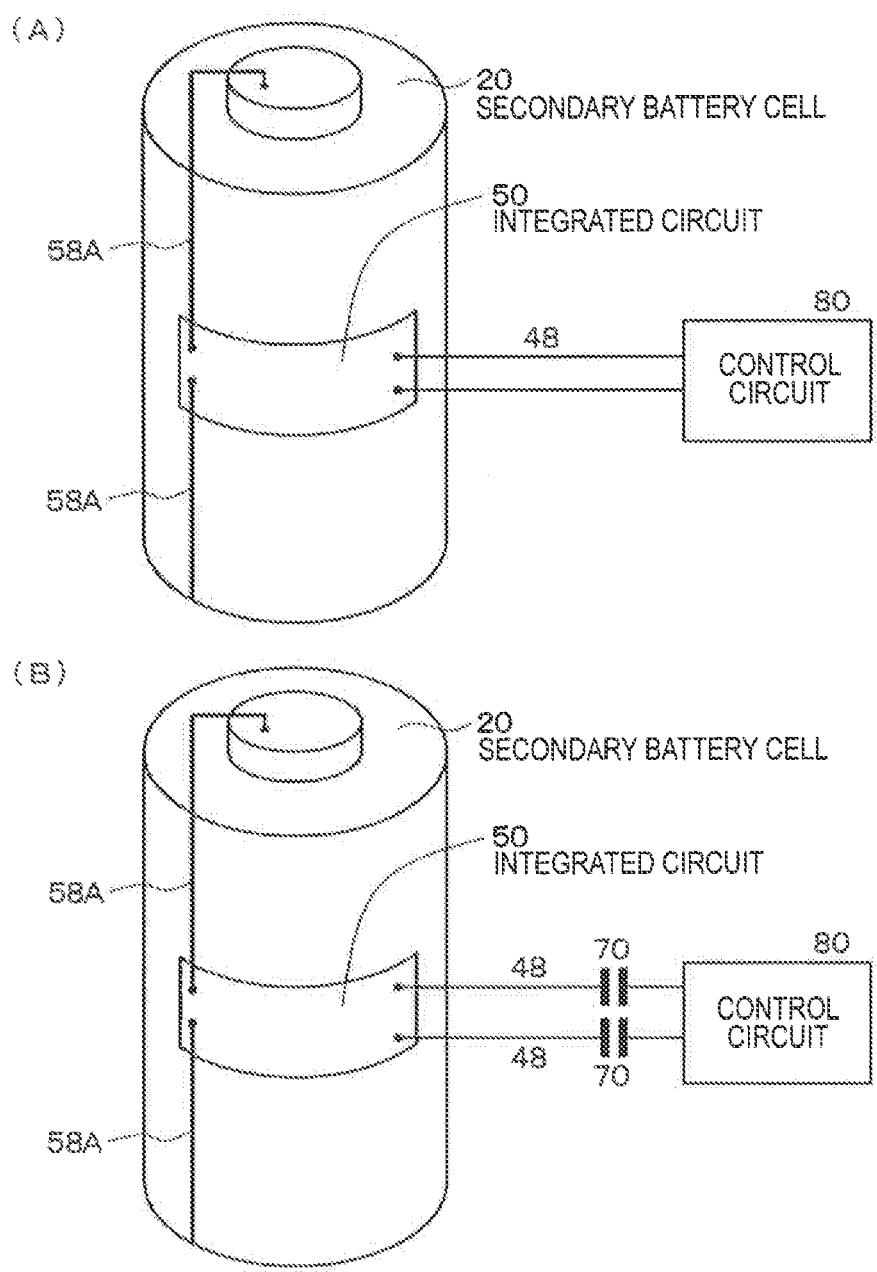
FIGS. 12(A) and 12(B) are schematic perspective views of secondary battery cells of Example 8.

Example 8 is another modification of Example 1. As shown in schematic perspective views of secondary battery cells in FIGS. 12(A) and 12(B), each integrated circuit 50 in Example 8 is provided on the outer surface of a secondary battery cell 20, as in Example 7. Also, the power source of each integrated circuit 50 is a secondary battery cell, and information is by a wired method. Specifically, the integrated circuit 50 is connected to the battery lid 34 and the battery can 31 of the secondary battery cell via a wire 58A, and the integrated circuit 50 is connected to a control circuit 80 by wires (sensing wires) 48 as in Example 4 (see FIG. 12(A)), or is connected to the control circuit 80 by capacitive couplings 70 and the wires 48 as in Example 5 (see FIG. 12(B)). Alternatively, the integrated circuit 50 and the control circuit 80 may be connected via a power line 18, as in Example 6. Except for the above mentioned aspects, the battery pack and secondary battery cells of Example 8 have the same configurations and structures as the battery pack and secondary battery cells described in Example 1, and therefore, detailed explanation thereof is not provided herein.

EXAMPLE 9

Figure 13:
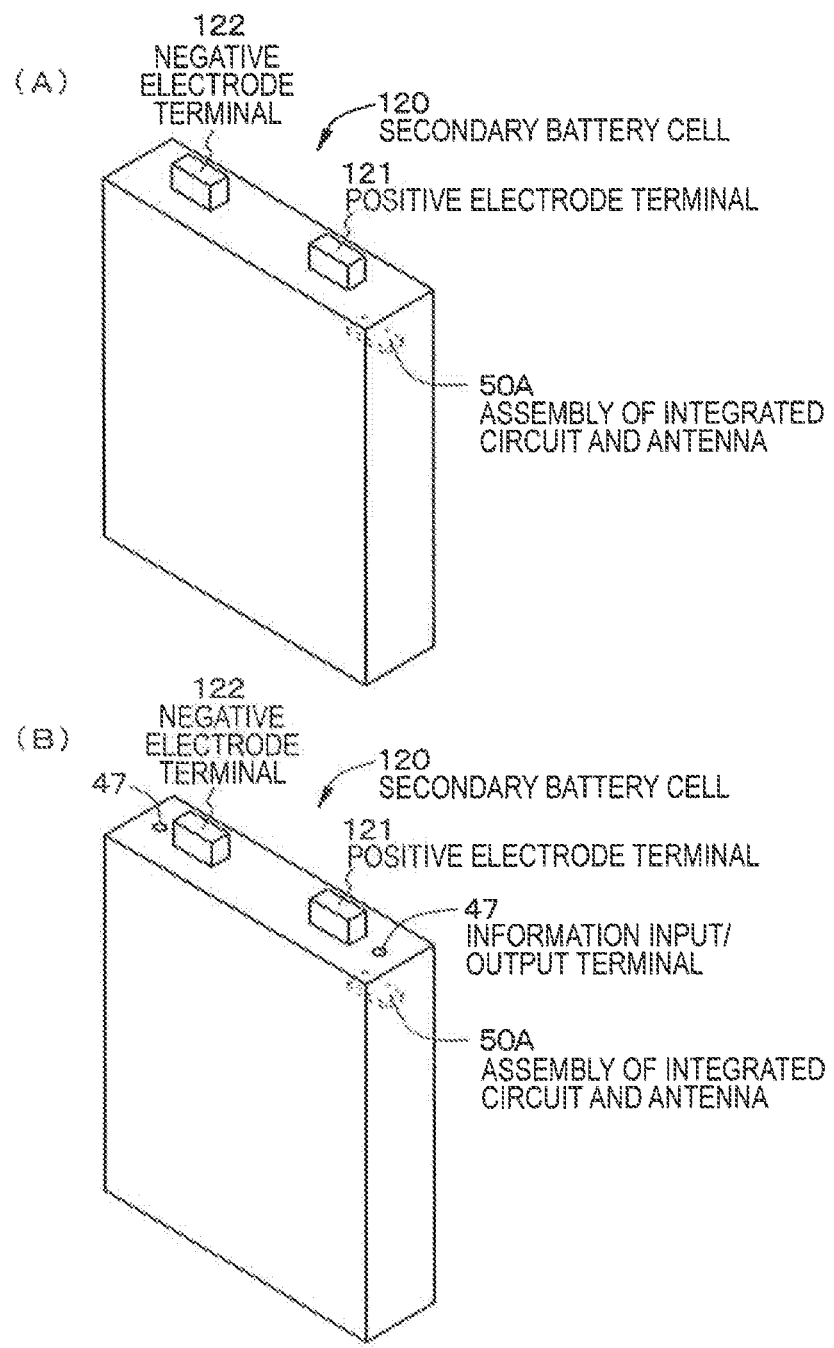
FIGS. 13(A) and 13(B) are schematic perspective views of a secondary battery cell of Example 9 and a modification thereof.

Example 9 is another modification of Example 1. In Example 9, each secondary battery cell 120 is a prismatic secondary battery cell. As shown in a schematic perspective view in FIG. 13(A), an integrated circuit is placed inside the secondary battery cell 120 (specifically, in an opening surrounded by an insulating spacer located immediately below a sealing plate (a cap plate)). As in Example 1, the power source is the secondary battery cell, and information is transmitted by a wireless method. The integrated circuit has an antenna that is not shown in the drawings. In FIG. 13(A) and FIG. 13(B), which will be described later, each integrated circuit assembly 50A provided inside the corresponding secondary battery cell 120 is schematically shown by a dashed line. A wound electrode body around which a positive electrode material and a negative electrode material having a separator interposed in between are wound is placed inside the secondary battery cell 120. Except for the above mentioned aspects, the secondary battery cells 120 and battery packs of Example 9 can be substantially the same as the secondary battery cells and battery packs of Example 1, and therefore, detailed explanation thereof is not provided herein.

Alternatively, each integrated circuit is provided in a secondary battery cell 120, and the power source is the secondary battery cell, but information may be transmitted by a wired method. That is, individual information and a measured battery state are sent to the outside of the secondary battery cell 120 (specifically, to a control circuit 80) in a wired manner. Specifically, as shown in a schematic perspective view in FIG. 13(B), information input/output terminals 47 are provided on the secondary battery cell 120, and the integrated circuit provided inside the secondary battery cell 120 is connected to the control circuit 80 via the information input/output terminals 47 and wires (not shown). Alternatively, the integrated circuit and the control circuit may be connected via a power line, as in Example 6.

Figure 14:
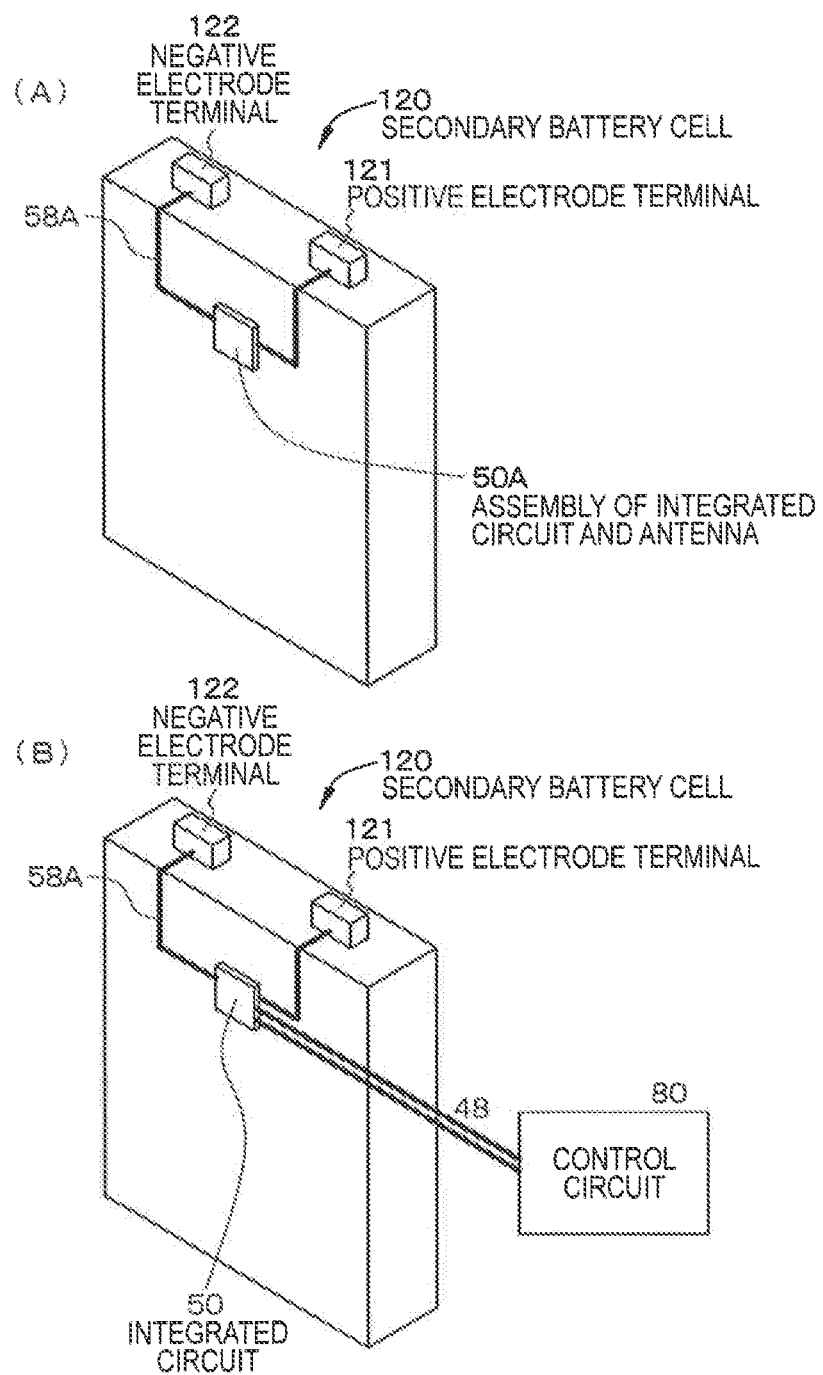
FIGS. 14(A) and 14(B) are schematic perspective views of modifications of the secondary battery cell of Example 9.

Alternatively, as shown in a schematic perspective view of a secondary battery cell 120 in FIG. 14(A), the integrated circuit is placed on an outer surface of the secondary battery cell 120. Specifically, the integrated circuit (or more specifically, an integrated circuit assembly 50A) is bonded to an outer surface of the secondary battery cell 120, or the integrated circuit is laminated with an appropriate means (such as an exterior film) on the outer surface of the secondary battery cell 120. The integrated circuit has the same configuration and structure as those described in Example 7. Also, the power source of the integrated circuit is the secondary battery cell, and the integrated circuit is connected to a positive electrode terminal 121 and a negative electrode terminal 122 of the secondary battery cell via wires 58A. A wireless method is used for transferring information, and the integrated circuit has an antenna. To measure current and voltage, the current measuring unit and the voltage measuring unit of the integrated circuit are connected to the positive electrode terminal 121 and the negative electrode terminal 122 via the wires 58A, where necessary.

Alternatively, as shown in a schematic perspective view of a secondary battery cell 120 in FIG. 14(B), the integrated circuit is placed on an outer surface of the secondary battery cell 120, as in Example 7. Also, the power source of the integrated circuit is a secondary battery cell, and information is transmitted by a wired method. Specifically, the integrated circuit is connected to the positive electrode terminal 121 and the negative electrode terminal 122 of the secondary battery cell 120 via the wires 58A. The integrated circuit is also connected to the control circuit 80 by the wires (the sensing wires) 48 as in Example 4, or is connected to the control circuit 80 via capacitive couplings and wires as in Example 5. Alternatively, the integrated circuit and the control circuit may be connected via a power line, as in Example 6.

The secondary battery cells may be of a laminate type. As shown in schematic exploded perspective views in FIGS. 15(A) and 15(B), each secondary battery cell 220 has an insulating separator 233 inserted between a positive electrode material plate 231 and a negative electrode material plate 232, and has a stack structure formed by stacking those plates. This stack structure and an electrolytic solution are sealed with an upper and lower aluminum laminates 234. A positive electrode terminal 221 and a negative electrode terminal 222 are attached to the positive electrode material plate 231 and the negative electrode material plate 232, and protrude out of the bonding portion between the aluminum laminates 234.

Figure 15:
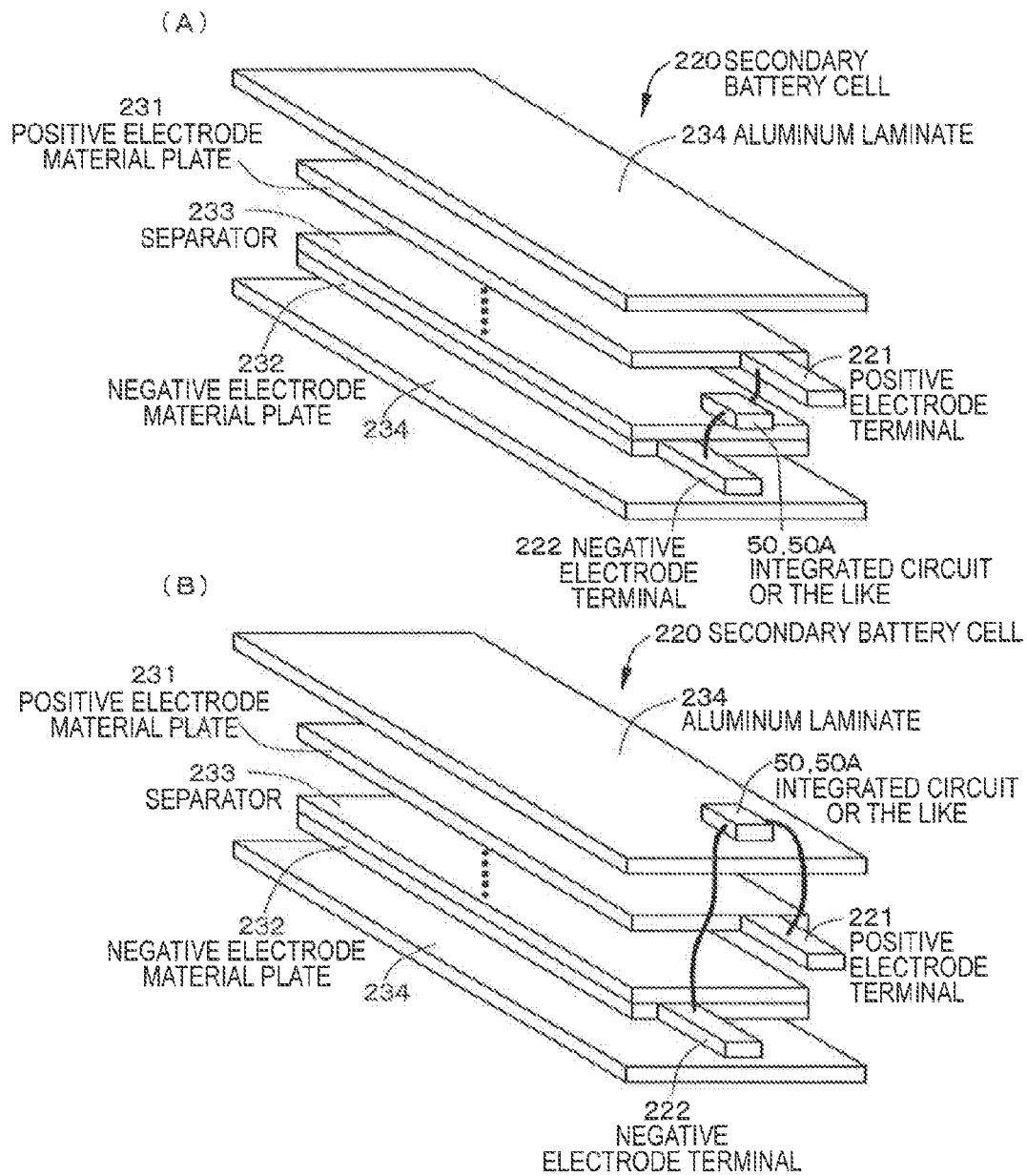
FIGS. 15(A) and 15(B) are schematic exploded perspective views of a secondary battery cell of Example 9 and a modification thereof.

In the secondary battery cell 220 shown in FIG. 15(A), the integrated circuit 50 or the integrated circuit assembly 50A is connected to the positive electrode terminal 221 and the negative electrode terminal 222, and the integrated circuit 50 or the integrated circuit assembly 50A is located at the bonding portion between the aluminum laminates 234. That is, the integrated circuit 50 or the integrated circuit assembly 50A is located inside the secondary battery cell 220. The power source is the secondary battery cell, and information can be transmitted by a wireless method or a wired method.

In the secondary battery cell 220 shown in FIG. 15(B), the integrated circuit 50 or the integrated circuit assembly 50A is connected to the positive electrode terminal 221 and the negative electrode terminal 222, but the integrated circuit 50 or the integrated circuit assembly 50A is located on an outer surface of the aluminum laminates 234. The power source is the secondary battery cell, and information can be transmitted by a wireless method or a wired method.

Although the present invention has been described so far based on preferred examples, the present invention is not limited to those examples. The configurations, structures, and connections of battery packs, secondary battery cells, integrated circuits, control circuits, and the like described in the above examples are merely examples, and can be modified where appropriate. In some cases, an integrated circuit that is formed with a bare chip and has a groove portion formed therein is mounted on a substrate so that the integrated circuit breaks at the groove portion when detached from the substrate. Alternatively, an integrated circuit formed with a bare chip may be mounted on a substrate, and the substrate and the integrated circuit may be connected via a wire bonding portion so that the wire bonding portion breaks when the integrated, circuit is detached from the substrate. Alternatively, an integrated circuit may be formed with a thin bare chip of 50 μm or smaller in thickness so that the integrated circuit breaks when detached. Further, those structures may be combined where appropriate.

REFERENCE SIGNS LIST

10 . . . Battery pack, 11 . . . Main unit, 12 . . . Closure member (lid), 13 . . . Fixing member (screw), 14 . . . Tap portion, 15 . . . Identification mark (serial ID), 16 . . . Output unit, 17 . . . Housing, 18 . . . Power line, 19A . . . Coupling capacitor, 19B . . . Reader/writer I/O, 19C, 19B . . . Low-pass filter, 20, 120, 220 . . . Secondary battery cell, 31 . . . Battery can, 32 . . . Upper insulating plate, 33 . . . Lower insulating plate, 34 . . . Battery lid, 35 . . . Safety valve mechanism, 35A . . . Disk plate, 36 . . . Thermal resistor element (PTC element), 37 . . . gasket, 40 . . . Wound electrode body, 41 . . . Positive electrode material, 42 . . . Negative electrode material, 43 . . . Separator, 44 . . . Center pin, 45 . . . Positive electrode lead, 46 . . . Negative electrode lead, 47 . . . Information input/output terminal, 48 . . . Wire (sensing wire), 50 . . . Integrated circuit, 50A . . . Integrated circuit assembly as an assembly of an integrated circuit and an antenna, 51 . . . Signal processing unit, 52 . . . Storage area, 53 . . . Memory unit, 54 . . . Temperature measuring unit, 55 . . . Current measuring unit, 56 . . . Voltage measuring unit, 57 . . . Antenna, 58, 58A . . . . Wire, 59 . . . Coupling capacitor, 61 . . . Cryptography processing unit, 62 . . . Random number generator, 70 . . . Capacitive coupling, 80 . . . Control circuit, 81 . . . MPU, 82 . . . Storage means, 83 . . . Communication circuit, 84 . . . Battery protection circuit, 85 . . . Printed wiring board, 121, 221 . . . Positive electrode terminal, 122, 222 . . . Negative electrode terminal, 231 . . . Positive electrode material plate, 232 . . . Negative electrode material plate, 233 . . . Separator, 234 . . . Aluminum laminate

The invention claimed is:

1. A secondary battery cell comprising:
an integrated circuit having stored identification information of the secondary battery cell,
wherein the integrated circuit is configured to:
receive a command, from a control circuit, to inquire about the identification information of the secondary battery cell, wherein the command from the control circuit is received based on a position of the secondary battery cell among a plurality of secondary battery cells; and
send the identification information, to the control circuit, based on the received command, wherein power supply of the secondary battery cell is controlled by the control circuit based on matching of the identification information with identification information of each of the plurality of secondary battery cells stored in the control circuit.

2. The secondary battery cell according to claim 1, wherein the integrated circuit has a storage area for storing presence or absence of the power supply from the secondary battery cell.

3. The secondary battery cell according to claim 1, wherein the integrated circuit is configured to send the identification information to the outside of the secondary battery cell in a wireless manner.

4. The secondary battery cell according to claim 1, wherein the integrated circuit is configured to send the identification information to the outside of the secondary battery cell in a wired manner.

5. The secondary battery cell according to claim 1, wherein the integrated circuit is configured to connect to a power line for supplying power to the outside, and send the identification information to the outside of the secondary battery cell via the power line, the power line extending through the secondary battery cell.

6. The secondary battery cell according to claim 1, wherein the integrated circuit is configured to connect between a positive electrode and a negative electrode of the secondary battery cell.

7. The secondary battery cell according to claim 1, wherein the integrated circuit is placed inside the secondary battery cell.

8. The secondary battery cell according to claim 1, wherein the integrated circuit is placed outside the secondary battery cell.

9. A battery pack comprising:
a plurality of secondary battery cells, each including an integrated circuit having stored identification information; and
a control circuit having stored thereon the identification information of each of the plurality of secondary battery cells, wherein the control circuit is configured to:
transmit a command, to the integrated circuit of each of the plurality of secondary battery cells, to inquire about the identification information of corresponding secondary battery cell, wherein the command is transmitted based on a position of the corresponding secondary battery cell among the plurality of secondary battery cells;
receive the identification information from the integrated circuit corresponding to each of the plurality of secondary battery cells; and
stop power supply from the battery pack in a state the received identification information does not match the stored identification information, corresponding to one of the plurality of secondary battery cells.

10. The battery pack according to claim 9, wherein the integrated circuit has a storage area for storing presence or absence of the power supply from the corresponding one of the plurality of secondary battery cells.

11. The battery pack according to claim 9, wherein the control circuit is configured to wirelessly receive the identification information from the integrated circuit provided in each of the plurality of secondary battery cells.

12. The battery pack according to claim 9, wherein the control circuit is configured to receive the identification information from the integrated circuit provided in each of the plurality of secondary battery cells, based on capacitive coupling.

13. The battery pack according to claim 9, wherein
the integrated circuit is configured to connect to the control circuit via a power line for supplying power to the outside of the battery pack, the power line extending through the plurality of secondary battery cells, and
the control circuit is configured to receive, via the power line, the identification information from the integrated circuit provided in each of the plurality of secondary battery cells.

14. The battery pack according to claim 13, wherein a bandpass filter is provided between the integrated circuit and the power line.

15. The battery pack according to claim 9, wherein the integrated circuit is configured to connect between a positive electrode and a negative electrode of the corresponding one of the plurality of secondary battery cells.

16. An electric power consumption device comprising:
a battery pack including:
a plurality of secondary battery cells, each including an integrated circuit having stored identification information; and
a control circuit having stored thereon the identification information of each of the plurality of secondary battery cells, wherein the control circuit is configured to:
transmit a command, to the integrated circuit of each of the plurality of secondary battery cells, to inquire about the identification information of corresponding secondary battery cell, wherein the command is transmitted based on a position of the corresponding secondary battery cell among the plurality of secondary battery cells;
receive the identification information from the integrated circuit corresponding to each of the plurality of secondary battery cells; and
stop power supply from the battery pack in a state the received identification information does not match the stored identification information, corresponding to one of the plurality of secondary battery cells.

17. The battery pack according to claim 9, wherein the control circuit is configured to sequentially send, at predetermined time intervals, the command to the integrated circuit corresponding to each of the plurality of secondary battery cells to inquire about the identification information.

18. The battery pack according to claim 17, wherein the control circuit is configured to determine the predetermined time intervals to sequentially send the command, based on positional information of each of the plurality of secondary battery cells in the battery pack.

19. The battery pack according to claim 9, wherein the control circuit is configured to determine whether the identification information received from the integrated circuit matches the identification information, stored in the control circuit, corresponding to one of the plurality of secondary battery cells to which the command is sent.

* * * * *